(12) United States Patent
Yamamuro et al.

(10) Patent No.: US 12,355,897 B2
(45) Date of Patent: Jul. 8, 2025

(54) DATA MANAGEMENT APPARATUS AND DATA MANAGEMENT METHOD

(71) Applicant: TOYOTA JIDOSHA KABUSHIKI KAISHA, Toyota (JP)

(72) Inventors: Naoki Yamamuro, Nagoya (JP); Junya Watanabe, Nagakute (JP); Shigeki Matsumoto, Nagoya (JP); Yoshikazu Jikuhara, Susono (JP); Ryota Suzuki, Ikeda (JP); Yuki Yamashita, Oota-ku (JP); Hitoshi Murakami, Setagaya-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 18/260,545

(22) PCT Filed: Oct. 11, 2021

(86) PCT No.: PCT/JP2021/037503
§ 371 (c)(1),
(2) Date: Jul. 6, 2023

(87) PCT Pub. No.: WO2022/149324
PCT Pub. Date: Jul. 14, 2022

(65) Prior Publication Data
US 2024/0056314 A1 Feb. 15, 2024

(30) Foreign Application Priority Data
Jan. 7, 2021 (JP) ................. 2021-001450

(51) Int. Cl.
*H04L 9/32* (2006.01)
*H04L 9/00* (2022.01)

(52) U.S. Cl.
CPC .......... *H04L 9/3263* (2013.01); *H04L 9/3297* (2013.01); *H04L 9/50* (2022.05)

(58) Field of Classification Search
CPC ....... H04L 9/3263; H04L 9/3297; H04L 9/50; G06Q 10/10; G06Q 30/018; G06Q 2220/00; G06Q 50/26; G06Q 50/184
See application file for complete search history.

(56) References Cited

U.S. PATENT DOCUMENTS 11,379,771 B2 * 7/2022 Ganesan ............ G06Q 10/0633
11,574,305 B1 * 2/2023 Griffin ................. G06Q 20/02
(Continued)

FOREIGN PATENT DOCUMENTS

JP 2005-123980 A 5/2005
JP 2005-151358 A 6/2005
(Continued)

OTHER PUBLICATIONS

International Search Report issued Jan. 11, 2022 in PCT/JP2021/037503, filed on Oct. 11, 2021, 2 pages.
(Continued)

*Primary Examiner* — Azizul Choudhury
(74) *Attorney, Agent, or Firm* — Oblon, McClelland, Maier & Neustadt, L.L.P.

(57) ABSTRACT

A data management system includes a plurality of data management apparatuses, a certification authority group, and a time stamp authority group. In making an application for a proof of existence of invention information, the data management apparatus generates an invention hash, and transmits the invention hash to selected time stamp authorities of the time stamp authority group. Each of the time stamp authorities having received the invention hash generates a time stamp token. The data management apparatus acquires the time stamp token from each of the plurality of
(Continued)

time stamp authorities to which the invention hash has been transmitted.

5 Claims, 19 Drawing Sheets

(56) References Cited

U.S. PATENT DOCUMENTS

| | | |
|---|---|---|
| 2005/0094178 A1 | 5/2005 | Anno |
| 2012/0023560 A1 | 1/2012 | Yanagi |
| 2016/0371509 A1* | 12/2016 | Unitt ................. H04M 3/42221 |
| 2021/0211468 A1* | 7/2021 | Griffin ..................... H04L 9/50 |
| 2021/0314155 A1* | 10/2021 | Novotny ............... H04L 9/3239 |

FOREIGN PATENT DOCUMENTS

| | | |
|---|---|---|
| JP | 2007-41903 A | 2/2007 |
| JP | 2012-28979 A | 2/2012 |
| JP | 2019-46442 A | 3/2019 |
| JP | 2019-521627 A | 7/2019 |
| JP | 2020-512714 A | 4/2020 |
| JP | 2020-166732 A | 10/2020 |
| WO | WO 2017/200483 A1 | 11/2017 |
| WO | WO 2019/023452 A1 | 1/2019 |

OTHER PUBLICATIONS

"Trusted timestamping", WikipediA, Retrieved from URL: https://en.wikipedia.org/w/index.php?title=Trusted_timestamping&oldid=996281914, Dec. 25, 2020, 5 pages.

* cited by examiner

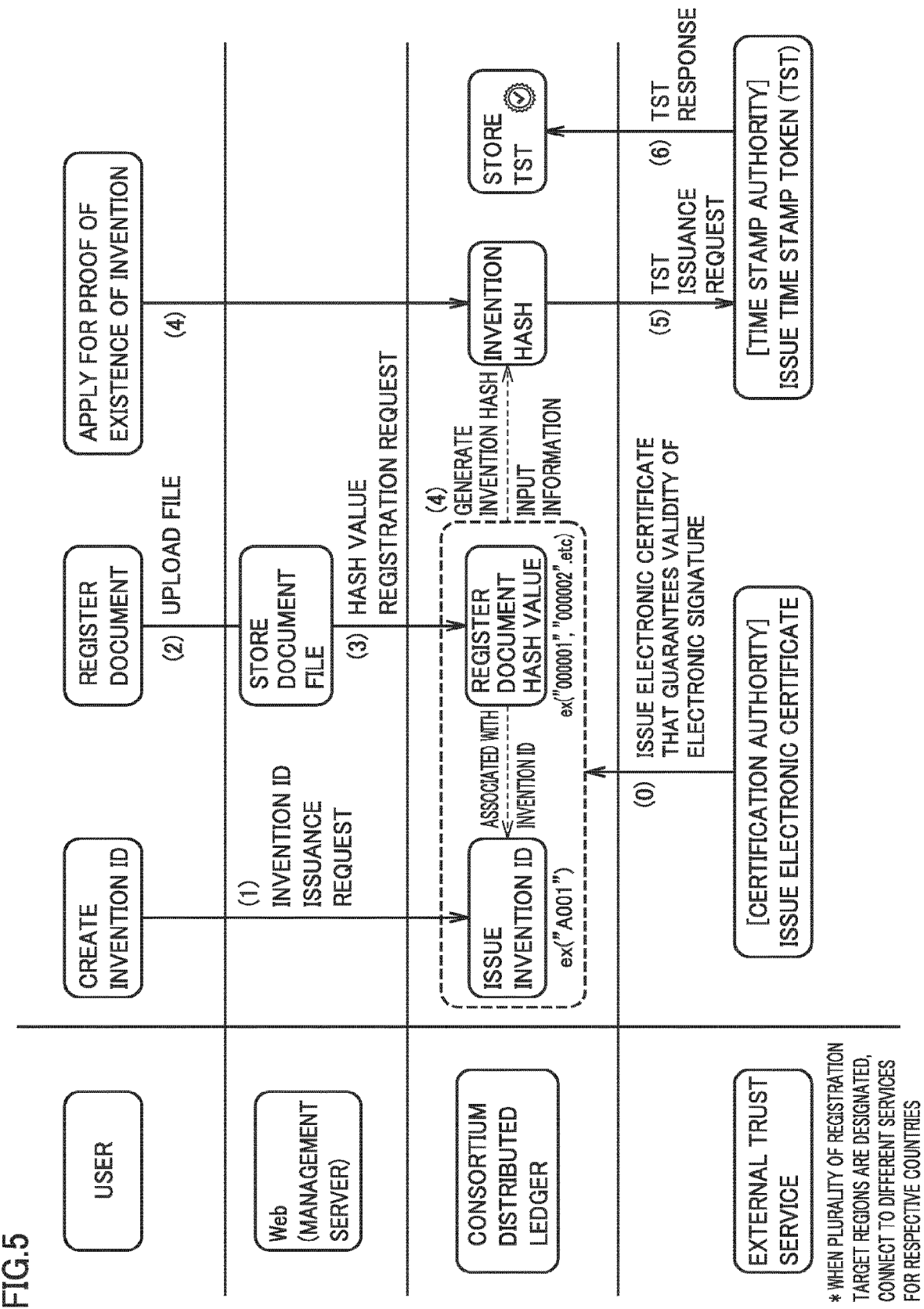

FIG.6

171 — INVENTION INFORMATION MANAGEMENT

172 — INVENTION PROJECT
- A001
- A002
- A003
- A004
- ADD PROJECT

173 — VERSION INFORMATION
- Jan 1, 2020
- Dec 23, 2019
- Nov 15, 2019

174

| INVENTION TITLE | XXXXXXXXXXXX |
| INVENTION ID | A001 |
| DESCRIPTION | XXXXXXXXXXXXXXXXXXXXXXXX XXXXXXXXXXXXXXXXXXXXXXXX |

DOCUMENT

| ID | DOCUMENT NAME | SIZE | REGISTRATION DATE | FILE | |
|---|---|---|---|---|---|
| doc000001 | XXXXXXXXXX | xxMB | 2020/1/1 10:18 | ⊙ | × |
| doc000002 | XXXXXXXXXX | xxMB | 2020/1/1 9:13 | ⊙ | × |

⊕ ADD FILE

PROOF OF EXISTENCE

| TARGET REGION | Timestamp | TRUST SERVICE NAME | CERTIFICATE FOR PROOF OF EXISTENCE | |
|---|---|---|---|---|
| CHINA | January 1, 2020 at 11:11 | XXXXXXXXXXXXXX | ⊙ | × |
| EU | January 1, 2020 at 11:11 | XXXXXXXX | ⊙ | × |
| JAPAN | January 1, 2020 at 11:10 | XXXXXXXXX | ⊙ | × |

ISSUE PROOF OF EXISTENCE

INVENTION INFORMATION MANAGEMENT | PROOF-OF-EXISTENCE CERTIFICATE

| INVENTION TITLE | XXXXXXXXXXXXX |
| DESCRIPTION | A001 |

XXXXXXXXXXXXXXXXXXXX
XXXXXXXXXXXXXXXXXXXX

| REGISTRATION DATE | FILE | | |
|---|---|---|---|
| 2020/1/1 10:18 | ⊚ | ⤓ | ✕ |
| 2020/1/1 9:13 | ⊚ | ⤓ | ✕ |

ISSUE PROOF OF EXISTENCE

| INVENTION TITLE | XXXXXXXXXXX |
| INVENTION ID | A001 |

SELECT TARGET COUNTRIES:

| JAPAN | CHINA | US | EU |
|---|---|---|---|
| ☑ | ☑ | ☐ | ☑ |

ISSUE PROOF OF EXISTENCE

| TARGET REGION | Timestamp | TRUST SERVICE NAME | CERTIFICATE FOR PROOF OF EXISTENCE | | |
|---|---|---|---|---|---|
| | | | ⊚ | ⤓ | ✕ |
| | | | ⊚ | ⤓ | ✕ |
| | | | ⊚ | ⤓ | ✕ |

ISSUE PROOF OF EXISTENCE

| INVENTION PROJECT | VERSION INFORMATION |
|---|---|
| A001 | Jan. 1, 2020 |
| A002 | Dec 23, 2 |
| A003 | Nov 15, 2 |
| A004 | |
| ⊕ ADD PROJECT | |

🔍

DATA MANAGEMENT APPARATUS AND DATA MANAGEMENT METHOD

TECHNICAL FIELD

The present disclosure relates to a data management apparatus and a data management method to manage data using a distributed ledger technology.

BACKGROUND ART

Japanese Patent Laying-Open No. 2019-46442 (PTL 1) discloses an intellectual property management system in which intellectual-property-related data such as patent is stored in a shared ledger such as blockchain. The intellectual property management system generates authentication data based on the data of the shared ledger, and requests an externally connected authentication service to authenticate the authentication data. Then, the intellectual property management system records the date and time of the authentication. Thus, accuracy of recording of the data is guaranteed.

CITATION LIST

Patent Literature

PTL 1: Japanese Patent Laying-Open No. 2019-46442
PTL 2: Japanese National Patent Publication No. 2019-521627

SUMMARY OF INVENTION

Technical Problem

In view of deployment or the like of businesses across many countries in recent years, it has become important to guarantee accuracy of time of recording of data in a plurality of countries and/or regions. However, in some cases, authentication by an authentication service in a certain country may not be formally approved in the other countries. Therefore, for example, accuracy of time of recording of data authenticated by the authentication service in the certain country is not necessarily guaranteed by the authentication in a country other than the country to which the authentication service belongs. A mechanism has been desired by which accuracy of time of recording of data is guaranteed in a plurality of countries and/or regions.

The present disclosure has been made to solve the above-described problem and has an object to guarantee accuracy of time of recording of data in a plurality of countries and/or regions.

Solution to Problem (1) A data management apparatus according to an aspect of the present disclosure manages data using a distributed ledger technology. The data management apparatus includes: a storage that stores a distributed ledger; a controller that registers, in the distributed ledger, transaction data including information of the data; and a communication apparatus that is capable of communicating with a plurality of time stamp authorities. The plurality of time stamp authorities are time stamp authorities that are based on standards different from each other. The controller transmits the transaction data to at least one selected time stamp authority of the plurality of time stamp authorities via the communication apparatus, and acquires a time stamp token of the transaction data from the selected time stamp authority, and the controller registers the time stamp token in the distributed ledger.

According to the above configuration, the controller transmits the transaction data including the information of the data (hereinafter also referred to as "target data") to be managed in the distributed ledger to the at least one selected time stamp authority of the plurality of time stamp authorities via the communication apparatus, and acquires the time stamp token of the transaction data from the selected time stamp authority. Then, the controller registers the acquired time stamp token in the distributed ledger. Thus, the time stamp token acquired from the time stamp authority is managed in the distributed ledger. The plurality of time stamp authorities are time stamp authorities that are based on standards different from each other. By acquiring the time stamp tokens from such a plurality of time stamp authorities and managing them in the distributed ledger, accuracy of time of recording of data is guaranteed in a plurality of countries and/or regions.

(2) In an embodiment, the data management apparatus further includes an input apparatus that is capable of selecting any time stamp authority from the plurality of time stamp authorities via the communication apparatus. The controller transmits the transaction data to a time stamp authority selected by an input to the input apparatus.

For example, in some cases, depending on the contents, attributes, and the like of the target data, it may be unnecessary to acquire the time stamp tokens from all of the plurality of time stamp authorities. According to the above configuration, a user of the data management apparatus can select a time stamp authority from which a time stamp token is to be acquired. Thus, for example, a time stamp token can be avoided from being acquired from a time stamp authority from which no time stamp token needs to be acquired, thereby reducing a processing load.

(3) In an embodiment, the controller transmits, to the at least one selected time stamp authority of the plurality of time stamp authorities via the communication apparatus, a hash value obtained by hashing the transaction data, and acquires a time stamp token of the hash value from the selected time stamp authority, and the controller registers the time stamp token in the distributed ledger.

According to the above configuration, the controller transmits the hash value of the transaction data including the information of the target data to the at least one selected time stamp authority of the plurality of time stamp authorities via the communication apparatus, and acquires the time stamp token of the hash value from the selected time stamp authority. Then, the controller registers the acquired time stamp token in the distributed ledger. Thus, the time stamp token acquired from the time stamp authority is managed in the distributed ledger. Also with such a configuration, accuracy of time of recording of data can be guaranteed in a plurality of countries and/or regions.

(4) In an embodiment, the controller re-hashes the data, and the controller compares the re-hashed value with the hash value having the time stamp token acquired, and verifies a proof of existence of the data based on a result of the comparison.

According to the above configuration, the proof of existence of the data can be verified, thereby proving that the data has existed at the time included in the time stamp token, and that the data has not been tampered with after that time.

(5) In an embodiment, the data is associated with ID information. The input apparatus is capable of selecting the ID information. The controller reads out, from the distributed ledger, at least one piece of transaction data associated with the ID information selected by an operation on the input apparatus, the controller transmits, to the at least one selected time stamp authority of the plurality of time stamp authorities via the communication apparatus, hash data obtained by collectively hashing the at least one piece of transaction data read out, and acquires a time stamp token of the hash data from the selected time stamp authority, and the controller registers the time stamp token in the distributed ledger.

According to the above configuration, the user of the data management apparatus can acquire the time stamp token of the hash data at any timing.

(6) In an embodiment, the controller re-hashes the at least one piece of transaction data associated with the ID information, and the controller compares the re-hashed value with the hash data having the time stamp token acquired, and verifies a proof of existence of the data based on a result of the comparison.

According to the above configuration, the proof of existence of the data can be verified based on each piece of hash data as a unit.

(7) In an embodiment, the communication apparatus is capable of communicating with a plurality of key certification authorities. The plurality of key certification authorities are certification authorities that respectively issue, based on standards different from each other, electronic certificates to private keys and public keys, a public key of the public keys being paired with a private key of the private keys. The electronic certificates include respective pieces of information of the public keys. The storage stores (i) the private keys respectively corresponding to the plurality of key certification authorities and (ii) the electronic certificates respectively issued by the plurality of key certification authorities. The controller generates electronic signatures for the plurality of key certification authorities by using the private keys, respectively, and the controller includes, in the transaction data, the respective electronic signatures for the plurality of key certification authorities.

According to the above configuration, the respective electronic signatures for the plurality of certification authorities are included in one piece of transaction data to be registered in the distributed ledger. A validity of an electronic signature may differ among countries or regions due to a difference between the standards. Since the plurality of electronic signatures in the different standards are included in the transaction data, the validities of the electronic signatures included in the transaction data can be proved in the plurality of countries and/or regions. Thus, reliability of the data registered in the distributed ledger is increased, thereby suppressing spoofing by a third party or tampering of data.

(8) In an embodiment, the communication apparatus is capable of communicating with a plurality of key certification authorities. The plurality of key certification authorities are certification authorities that respectively issue, based on standards different from each other, electronic certificates to private keys and public keys, a public key of the public keys being paired with a private key of the private keys. The electronic certificates include respective pieces of information of the public keys. The storage stores (i) the private keys respectively corresponding to the plurality of key certification authorities and (ii) the electronic certificates respectively issued by the plurality of key certification authorities. The controller generates electronic signatures for the plurality of key certification authorities by using the private keys, respectively, and for one process, the controller registers, in the distributed ledger, a plurality of pieces of transaction data corresponding to the plurality of key certification authorities. Each of the plurality of pieces of transaction data includes an electronic signature of a corresponding key certification authority.

According to the above configuration, for one process, the plurality of pieces of transaction data corresponding to the plurality of key certification authorities are registered in the distributed ledger. As described above, a validity of an electronic signature may differ among countries or regions due to a difference between the standards; however, for one process, the plurality of pieces of transaction data including the electronic signatures that are based on the different standards are registered in the distributed ledger, with the result that the validities of the electronic signatures can be proven in the plurality of countries and/or regions. Thus, reliability of the data registered in the distributed ledger is increased, thereby suppressing spoofing by a third party and tampering of data.

(9) In an embodiment, the controller decodes each of the electronic signatures for the plurality of key certification authorities by using a corresponding public key included in each of the electronic certificates for the plurality of key certification authorities, and the controller verifies, based on a result of the decoding, a validity of each of the electronic signatures for the plurality of key certification authorities.

According to the above configuration, the validities of the plurality of electronic signatures included in the transaction data or the electronic signatures respectively included in the pieces of transaction data can be verified.

(10) In an embodiment, the data is intellectual-property-related data.

Regarding the intellectual-property-related data, in view of the right of prior use or the like, it is important to guarantee accuracy of time of recording of the data, and according to the above configuration, accuracy of time of recording of the intellectual-property-related data can be guaranteed.

(11) A data management method according to another aspect of the present disclosure is a data management method for a data management apparatus that manages data using a distributed ledger technology. The data management apparatus include: a storage that stores a distributed ledger; a controller that registers, in the distributed ledger, transaction data including information of the data; and a communication apparatus that is capable of communicating with a plurality of time stamp authorities. The plurality of time stamp authorities are time stamp authorities that are based on standards different from each other. The data management method includes: transmitting the transaction data to at least one selected time stamp authority of the plurality of time stamp authorities; acquiring a time stamp token of the transaction data from the selected time stamp authority; and registering the time stamp token in the distributed ledger.

Advantageous Effects of Invention

According to the present disclosure, accuracy of time of recording of data can be guaranteed in a plurality of countries and/or regions.

BRIEF DESCRIPTION OF DRAWINGS

FIG. 5 is a sequence diagram for illustrating a flow from creation of the DAG data to the application for the proof of existence (the acquisition of the time stamp token).

FIG. 6 is a diagram for illustrating an interface screen for making an application for a proof of existence (acquisition of a time stamp token).

FIG. 7 is a diagram for illustrating an interface screen displayed when a button "ISSUE PROOF OF EXISTENCE" in FIG. 6 is selected.

DESCRIPTION OF EMBODIMENTS

Figure 1:
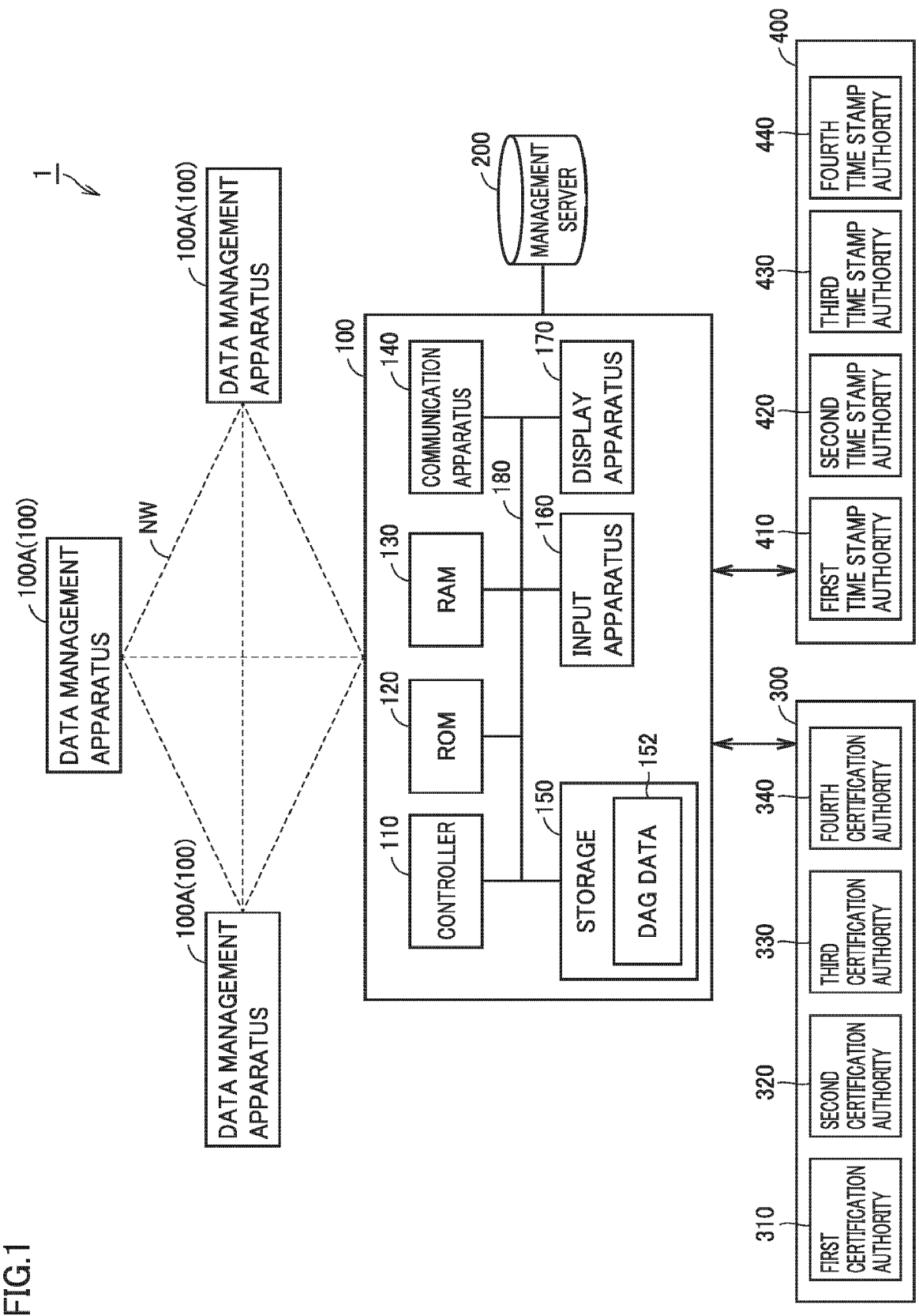
FIG. 1 is a diagram showing a schematic configuration of a data management system according to a first embodiment.

Hereinafter, embodiments of the present disclosure will be described in detail with reference to figures. In a first embodiment, it will be illustratively described that a distributed ledger technology using DAG (Directed Acyclic Graph) is applied to a data management system that manages data using a distributed ledger technology. In a second embodiment, it will be illustratively described that a distributed ledger technology using blockchain is applied to a data management system that manages data using a distributed ledger technology. It should be noted that the data management system can also be applied to other distributed ledger technologies other than the distributed ledger technology using DAG and the distributed ledger technology using blockchain. It should be noted that in the figures, the same or corresponding portions are denoted by the same reference characters, and will not be described repeatedly.

First Embodiment

<Overall Configuration of Data Management System>

FIG. 1 is a diagram showing a schematic configuration of a data management system 1 according to a first embodiment. Data management system 1 according to the present embodiment is a system for forming a network between a plurality of companies to manage intellectual-property-related data such as patent. It should be noted that the data managed by data management system 1 is not limited to the intellectual-property-related data, and may be various types of data.

Referring to FIG. 1, data management system 1 includes four data management apparatuses 100, a certification authority group 300, and a time stamp authority group 400. Four data management apparatuses 100 are data management apparatuses respectively belonging to different companies (for example, a company A, a company B, a company C, and a company D). In FIG. 1, data management apparatus 100 of company A is denoted as a data management apparatus 100, and data management apparatuses 100 of company B, company C, and company D are each denoted as a data management apparatus 100A. Hereinafter, data management apparatus 100 of company A will be representatively described, but each of data management apparatuses 100A also has the same function.

Four data management apparatuses 100, 100A form a network NW. A distributed ledger technology using DAG is applied to data management system 1 according to the first embodiment. A distributed ledger (hereinafter, also simply referred to as "DAG") using DAG includes various types of information (recording information) including a history of recording of the intellectual-property-related data such as patent or the like. The DAG stores all the pieces of recording information during a period of time from the start of operation of data management system 1 to the present time. It should be noted that in data management system 1 according to the present embodiment, it will be illustratively described that four data management apparatuses form network NW; however, any number of data management apparatuses may form network NW, and the number of data management apparatuses may be, for example, less than four or five or more.

Data management apparatus 100 is, for example, a desktop PC (Personal Computer), a laptop PC, a tablet terminal, a smartphone, or another information processing terminal having a communication function. Data management apparatus 100 includes a controller 110, a ROM (Read Only Memory) 120, a RAM (Random Access Memory) 130, a communication apparatus 140, a storage 150, an input apparatus 160, and a display apparatus 170. Controller 110, ROM 120, RAM 130, communication apparatus 140, storage 150, input apparatus 160, and display apparatus 170 are connected to a bus 180. A management server 200 is communicatively connected to data management apparatus 100.

Controller 110 is constituted of, for example, an integrated circuit including a CPU (Central Processing Unit). Controller 110 deploys, in RAM 130, various types of programs stored in ROM 120 and executes them. The various types of programs include an operating system and the like. RAM 130 functions as a working memory and temporarily stores various types of data necessary for executing the various types of programs. Controller 110 has a function of generating private keys (for example, first to fourth private keys described later) and public keys (for example, first to fourth public keys described later) in conformity with a plurality of standards (for example, the Japan standard, the China standard, the US standard, the EU standard, and the like).

Communication apparatus 140 is capable of communicating with an external apparatus. Examples of the external apparatus include data management apparatus 100A, management server 200, certification authority group 300, time stamp authority group 400, and the like. Communication between communication apparatus 140 and the external apparatus is performed using the Internet, a wide area network (WAN), a local area network (LAN), an Ethernet (registered trademark) network, a public network, a private network, a wired network, a wireless network, or the like, or a combination thereof.

Storage 150 includes, for example, a storage medium such as a hard disk or a flash memory. Storage 150 stores DAG data 152. It should be noted that DAG data 152 is not limited to being stored in storage 150 and may be stored in ROM 120, RAM 130, or management server 200. DAG data 152 will be described in detail later. Storage 150 stores the private keys and the public keys generated by controller 110. Storage 150 stores electronic certificates respectively issued from a plurality of certification authorities included in certification authority group 300. It should be noted that the private keys, the public keys, and the electronic certificates are not limited to being stored in storage 150, and may be stored in ROM 120, RANI 130, or management server 200.

Input apparatus 160 includes an input device. The input device may be, for example, a mouse, a keyboard, a touch panel, and/or another apparatus capable of receiving a user operation.

Display apparatus 170 includes a display. Display apparatus 170 displays various types of images on the display in accordance with a control signal from controller 110. Examples of the display include a liquid crystal display, an organic EL (Electro Luminescence) display, and other display apparatuses.

Management server 200 stores the intellectual-property-related data such as patent. Management server 200 stores the intellectual-property-related data in accordance with a control signal from data management apparatus 100. It should be noted that the intellectual-property-related data may be stored in storage 150.

Certification authority group 300 includes a plurality of certification authorities. Each of the certification authorities includes a server belonging to a certification body that issues an electronic certificate. An applicant for an electronic certificate (in the present embodiment, data management apparatus 100) generates a private key and a public key, and transmits the generated public key to the certification authority. The certification authority generates an electronic certificate for the public key received from the applicant, and issues the electronic certificate to the applicant. Alternatively, the certification authority may generate a private key, a public key, and an electronic certificate in response to a request of the applicant (in the present embodiment, data management apparatus 100), and may issue them to the applicant. The certification authority issues the electronic certificate with public key information being included therein, for example. The plurality of certification authorities included in certification authority group 300 issues electronic certificates that conform to standards different from each other. In the present embodiment, certification authority group 300 includes four certification authorities, i.e., a first certification authority 310, a second certification authority 320, a third certification authority 330, and a fourth certification authority 340. It should be noted that any number of certification authorities may be included in certification authority group 300, and the number of certification authorities may be, for example, less than four or five or more.

First certification authority 310 includes, for example, a server belonging to a certification body that issues an electronic certificate that conforms to the Japan standard. The applicant generates a first private key and a first public key that conform to the Japan standard, and transmits the generated first public key to first certification authority 310. First certification authority 310 generates a first electronic certificate for the first public key received from the applicant, and issues the first electronic certificate to the applicant. It should be noted that when first certification authority 310 generates the first private key and the first public key, first certification authority 310 generates the first private key and the first public key in response to a request of the applicant, and issues the first private key and the first electronic certificate including the first public key to the applicant. Second certification authority 320 includes, for example, a server belonging to a certification body that issues an electronic certificate that conforms to the China standard. The applicant generates a second private key and a second public key that conform to the China standard, and transmits the generated second public key to second certification authority 320. Second certification authority 320 generates a second electronic certificate for the second public key received from the applicant, and issues the second electronic certificate to the applicant. It should be noted that when second certification authority 320 generates the second private key and the second public key, second certification authority 320 generates the second private key and the second public key in response to a request of the applicant, and issues the second private key and the second electronic certificate including the second public key to the applicant. Third certification authority 330 includes, for example, a server belonging to a certification body that issues an electronic certificate that conforms to the US standard. The applicant generates a third private key and a third public key that conform to the US standard, and transmits the generated third public key to third certification authority 330. Third certification authority 330 generates a third electronic certificate for the third public key received from the applicant, and issues the third electronic certificate to the applicant. It should be noted that when third certification authority 330 generates the third private key and the third public key, third certification authority 330 generates the third private key and the third public key in response to a request of the applicant, and issues the third private key and the third electronic certificate including the third public key to the applicant. Fourth certification authority 340 includes, for example, a server belonging to a certification body that issues an electronic certificate that conforms to the EU standard. The applicant generates a fourth private key and a fourth public key that conform to the EU standard, and transmits the generated fourth public key to fourth certification authority 340. Fourth certification authority 340 generates a fourth electronic certificate for the fourth public key received from the applicant, and issues the fourth electronic certificate to the applicant. It should be noted that when fourth certification authority 340 generates the fourth private key and the fourth public key, fourth certification authority 340 generates the fourth private key and the fourth public key in response to a request of the applicant, and issues the fourth private key and the fourth electronic certificate including the fourth public key to the applicant.

In the present embodiment, the first private key, the first electronic certificate, the second private key, the second electronic certificate, the third private key, the third electronic certificate, the fourth private key, and the fourth electronic certificate are stored in storage 150. It should be noted that each of first certification authority 310, second certification authority 320, third certification authority 330, and fourth certification authority 340 included in certification authority group 300 corresponds to an exemplary "key certification authority" according to the present disclosure.

Time stamp authority group 400 includes a plurality of time stamp authorities (TSA). Each time stamp authority includes a server belonging to a certification body that issues a time stamp token. The time stamp authority issues a time stamp token in response to a time stamp issuance request from the applicant (data management apparatus 100 in the present embodiment). More specifically, the time stamp authority transmits, to the applicant (data management apparatus 100 in the present embodiment), a time stamp token obtained by combining, with time information that is based on a time source having traceability in the international standard time, data (hash value) received from the applicant. The data transmitted from data management apparatus 100 to the time stamp authority may be, for example, a hash value of transaction data (described later), or may be a hash value (invention hash (described later)) obtained by collectively hashing at least one piece of transaction data associated with an ID (invention ID) of a certain invention. Although details of the transaction data will be described later, the transaction data is data including a hash value of the intellectual-property-related data stored in management server 200. The hash value is a numerical value obtained as a result of hashing the data using a hash function.

In the present embodiment, time stamp authority group 400 includes four time stamp authorities, i.e., a first time stamp authority 410, a second time stamp authority 420, a third time stamp authority 430, and a fourth time stamp authority 440. It should be noted that any number of time stamp authorities may be included in time stamp authority group 400, and the number of time stamp authorities may be, for example, less than four or five or more.

First time stamp authority 410, second time stamp authority 420, third time stamp authority 430, and fourth time stamp authority 440 are time stamp authorities that are based on standards different from each other in countries or regions. First time stamp authority 410 includes, for example, a server belonging to a time-stamping body that issues a time stamp that conforms to the Japan standard. Second time stamp authority 420 includes, for example, a server belonging to a time-stamping body that issues a time stamp that conforms to the China standard. Third time stamp authority 430 includes, for example, a server belonging to a time-stamping body that issues a time stamp that conforms to the US standard. Fourth time stamp authority 440 includes, for example, a server belonging to a time-stamping body that issues a time stamp that conforms to the EU standard.

<DAG Data>

Figure 2:
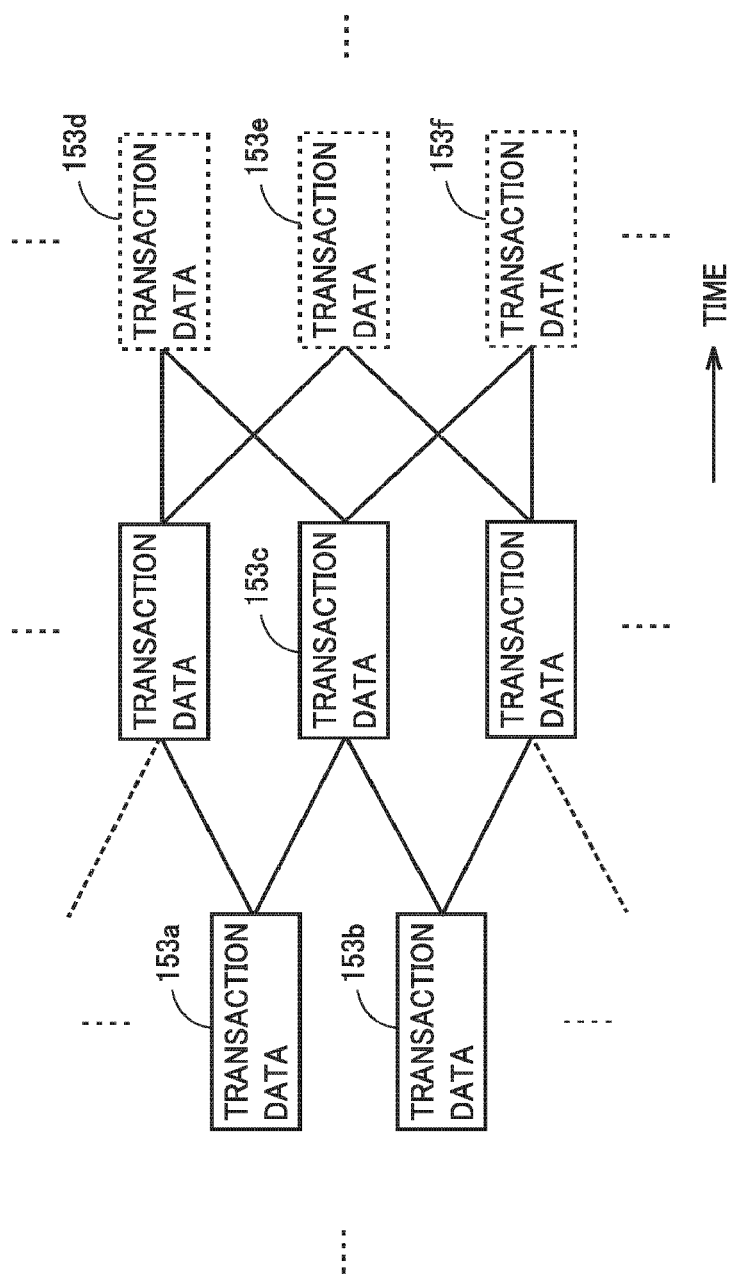
FIG. 2 is a diagram for illustrating DAG data.

FIG. 2 is a diagram for illustrating DAG data 152. As shown in FIG. 2, DAG data 152 has such a configuration that one piece of transaction data is connected to a plurality of pieces of transaction data in one direction so as to avoid them from being cyclic. The transaction data is data indicating a transaction, and will be described later in detail. DAG data 152 stores a history of recording of the intellectual-property-related data or the like in data management apparatuses 100, 100A that form network NW, during the period of time from the start of operation of data management system 1 to the present time. DAG data 152 is stored in each of all the data management apparatuses 100, 100A that form network NW. Thus, even if DAG data 152 is tampered with by a certain user, the tampering is prevented based on DAG data 152 of each of the plurality of other users as a reference.

In the example of DAG data 152 according to the present embodiment as shown in FIG. 2, a piece of transaction data is connected to respective pieces of transaction data of two transactions having occurred prior to a transaction corresponding to the foregoing piece of transaction data. This indicates that the piece of transaction data has a configuration including respective hash values of the pieces of transaction data of the two transactions having occurred prior to the transaction corresponding to the foregoing piece of transaction data. Specifically, by illustrating a case of adding transaction data 153$c$ to DAG data 152, the following describes a consensus building algorithm according to the present embodiment.

When registering a new piece of intellectual-property-related data, data management apparatus 100 stores, into management server 200, the intellectual-property-related data (for example, a document) to be newly registered, generates data (transaction data) 153$c$ of a transaction indicating this process, and transmits transaction data 153$c$ to network NW. Transaction data 153$c$ includes a hash value of the intellectual-property-related data (document). The hash value is a numerical value obtained as a result of hashing the intellectual-property-related data using a hash function. Further, transaction data 153$c$ includes the hash values of the pieces of transaction data 153$a$, 153$b$ of two transactions generated prior to the transaction (storing of the intellectual-property-related data into management server 200) corresponding to transaction data 153$c$. The inclusion of the respective hash values of transaction data 153$a$, 153$b$ in transaction data 153$c$ indicates that data management apparatus 100 has approved transaction data 153$a$, 153$b$ at the time of generation of transaction data 153$c$.

When generating transaction data 153$c$, data management apparatus 100 selects the two pieces of transaction data 153$a$, 153$b$ from pieces of past transaction data included in DAG data 152. In order to approve the selected pieces of transaction data 153$a$, 153$b$, data management apparatus 100 verifies the contents of the selected pieces of transaction data 153$a$, 153$b$. Further, data management apparatus 100 may retrospectively verify a piece of transaction data directly or indirectly approved by the pieces of transaction data 153$a$, 153$b$, so as to verify that invalid transaction data has not been approved. The expression "directly approved" means that the hash value of the transaction data is included, and for example, when the respective pieces of transaction data 153$a$, 153$c$ are taken as an example, transaction data 153$c$ directly approves transaction data 153$a$. The expression "indirectly approved" means that the transaction data is directly or indirectly approved by directly approved transaction data, and for example, when transaction data 153$a$, 153$c$, 153$f$ are taken as an example, transaction data 153$f$ includes the hash value of transaction data 153$c$ that directly approves transaction data 153$a$, and indirectly approves transaction data 153$a$.

The verification may be performed by, for example, a verification method using an electronic signature included in the transaction data, or another known verification method. When the verification of the contents of the transaction data is ended, data management apparatus 100 hashes the verified pieces of transaction data 153$a$, 153$b$, and includes these hash values in transaction data 153$c$. It should be noted that the two pieces of transaction data 153$a$, 153$b$ may be selected randomly from the pieces of past transaction data, or may be selected using a selection algorithm such as a Markov chain Monte Carlo method.

Transaction data 153$c$ transmitted from data management apparatus 100 to network NW is approved later by data management apparatus 100A or/and data management apparatus 100 in the same manner as described above. For example, transaction data 153c is approved by the respective pieces of transaction data 153d, 153f.

Further, a load on transaction data may be taken into consideration in approving the transaction data. A cumulative load, which is a sum of loads of pieces of transaction data that directly or indirectly approve the transaction data, is set in the transaction data. That is, it is indicated that as the value of the cumulative load is larger, the number of pieces of transaction data that approve the transaction data is larger. In other words, as the cumulative load is larger, a probability of the transaction data being valid is higher. The load may be set differently between a case where an entity (for example, data management apparatus 100) having generated the transaction data has approved it and a case where another entity (for example, data management apparatus 100A) has approved it.

<Transaction Data>

For example, the transaction data includes: invention ID information; a hash value of target data (intellectual-property-related data such as a document); time information of broadcasting the transaction data to network NW (of transmitting the transaction data to network NW); transmitter information for the transaction data; the hash value of the above-described past transaction data; an electronic signature; and the like. The intellectual-property-related data included in the transaction data is data related to the invention ID. The information of the invention ID and the hash value of the intellectual-property-related data will be described later in detail. It should be noted that the time information included in the transaction data may be time information indicating a time of occurrence of a process corresponding to the transaction data (for example, a process of recording the target data in management server 200).

The transmitter information for the transaction data is, for example, information indicating company A in the case of the transaction data transmitted to network NW by data management apparatus 100. It should be noted that more specifically, the transmitter information for the transaction data may be information indicating a department (one section of company A) that has performed the operation of transmitting the transaction data to network NW, or may be information indicating an individual (an employee of company A) who has performed the operation of transmitting the transaction data to network NW.

<Generation of Transaction Data>

Figure 3:
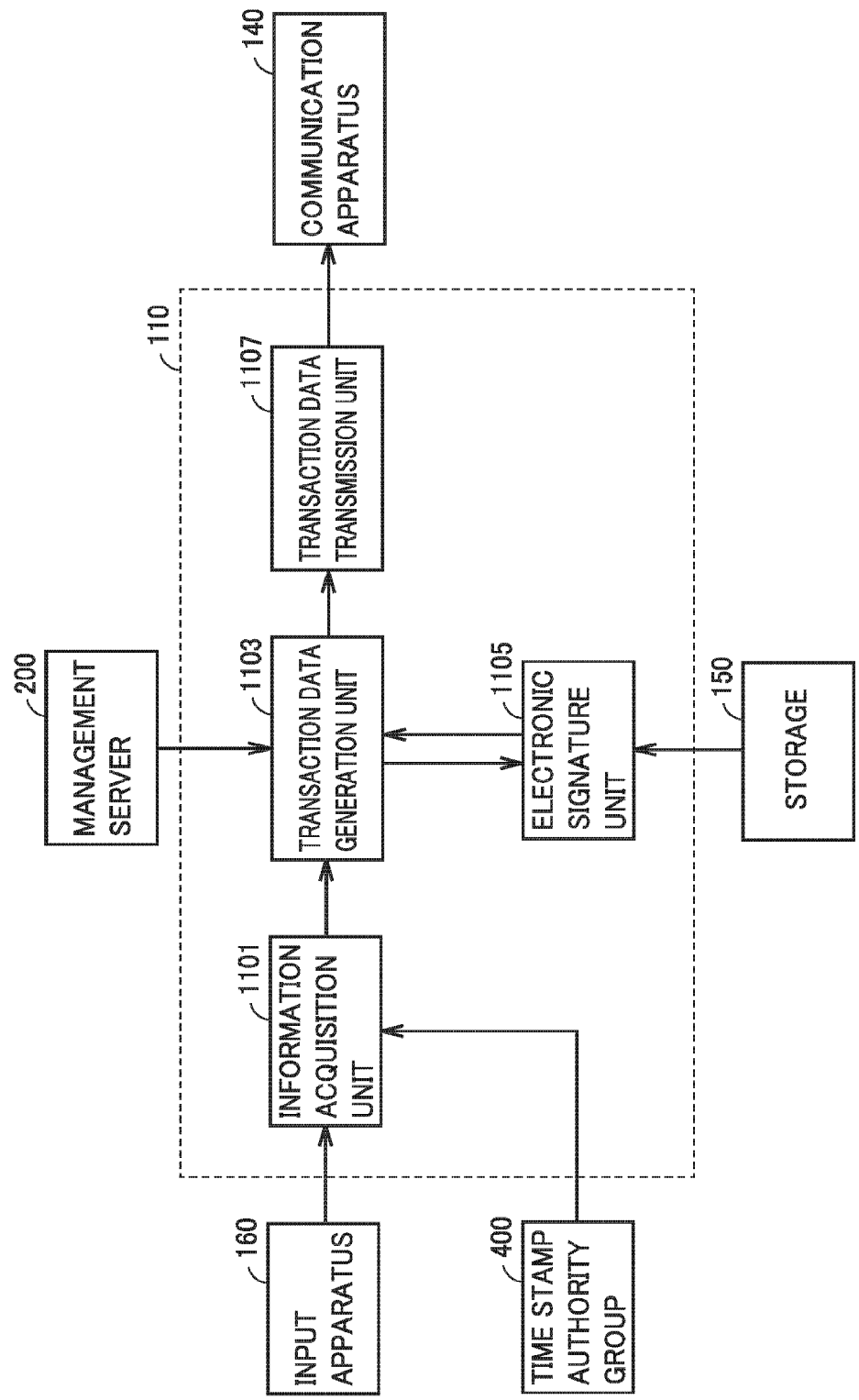
FIG. 3 is a functional block diagram of a controller for illustrating generation of transaction data.

FIG. 3 is a functional block diagram of controller 110 for illustrating generation of the transaction data. Referring to FIG. 3, controller 110 includes an information acquisition unit 1101, a transaction data generation unit 1103, an electronic signature unit 1105, and a transaction data transmission unit 1107. For example, controller 110 executes a program stored in ROM 120 so as to function as each of information acquisition unit 1101, transaction data generation unit 1103, electronic signature unit 1105, and transaction data transmission unit 1107. It should be noted that each of information acquisition unit 1101, transaction data generation unit 1103, electronic signature unit 1105, and transaction data transmission unit 1107 may be implemented by dedicated hardware (electronic circuit), for example.

Information acquisition unit 1101 acquires request information from a user via input apparatus 160. The request information includes, for example, a request for recording intellectual-property-related data or the like. For example, when a user of data management apparatus 100 operates input apparatus 160 to store (register) intellectual-property-related data in management server 200, a request for recording the intellectual-property-related data or the like is input to information acquisition unit 1101. Although details will be described later, information acquisition unit 1101 acquires a time stamp token from time stamp authority group 400 via communication apparatus 140. When the request information or the time stamp token is acquired, information acquisition unit 1101 outputs the request information or the time stamp token to transaction data generation unit 1103.

Transaction data generation unit 1103 generates transaction data to be transmitted to network NW. For example, when the request information for recording the intellectual-property-related data is acquired from information acquisition unit 1101, transaction data generation unit 1103 reads out the intellectual-property-related data (target data) from management server 200, and hashes the target data using a hash function. Then, transaction data generation unit 1103 generates the transaction data to include the hashed target data in DAG data 152. Further, for example, when the time stamp token is acquired from information acquisition unit 1101, transaction data generation unit 1103 hashes the time stamp token (target data) using a hash function to generate the transaction data to include the hashed time stamp token in DAG data 152.

Further, transaction data generation unit 1103 receives an electronic signature from electronic signature unit 1105. Transaction data generation unit 1103 includes the electronic signature in the transaction data.

Electronic signature unit 1105 reads out the first to fourth private keys from storage 150. Electronic signature unit 1105 generates a first electronic signature using the first private key. For example, electronic signature unit 1105 acquires the hashed target data from transaction data generation unit 1103, and encodes the hashed target data using the first private key, thereby generating the first electronic signature. Electronic signature unit 1105 outputs the generated first electronic signature to transaction data generation unit 1103. Electronic signature unit 1105 generates the second to fourth electronic signatures using the second to fourth private keys respectively in the same manner as the procedure of generation of the first electronic signature described above. Then, electronic signature unit 1105 outputs the second to fourth electronic signatures to transaction data generation unit 1103.

Transaction data generation unit 1103 includes the four electronic signatures (the first electronic signature, the second electronic signature, the third electronic signature, and the fourth electronic signature) in the transaction data. Then, transaction data generation unit 1103 outputs the transaction data to transaction data transmission unit 1107. It should be noted that when the transaction data has a data structure in which only one electronic signature can be included, the remaining three electronic signatures may be included in, for example, a data region of the transaction data in which any data can be included.

Transaction data transmission unit 1107 outputs, to communication apparatus 140, a control signal for transmitting the transaction data to network NW. Thus, the transaction data is transmitted to network NW via communication apparatus 140.

In some cases, a validity of an electronic certificate issued by a certification authority in a certain country may not be approved in other countries due to a difference between standards to which the certification authorities conform. In the present embodiment, the transaction data includes the plurality of electronic signatures (the first electronic signature, the second electronic signature, the third electronic signature, and the fourth electronic signature). Therefore, it is possible to guarantee the validities of the electronic signatures attached to the transaction data in the plurality of countries and/or regions.

<Application for Proof of Existence (Acquisition of Time Stamp Token)>

Regarding the intellectual-property-related data such as patent, in view of, for example, the right of prior use or the like, a time of recording the data may become important. Data management apparatus 100 according to the present embodiment stores the data (target data) in management server 200, acquires a time stamp token for the target data from the time stamp authority, and includes the time stamp token in DAG data 152. Thus, a proof of existence of the target data can be ensured. Further, since a time stamp token of a time stamp authority in a certain country may not be formally approved in other countries due to a difference between standards to which time stamp authorities conform, data management apparatus 100 according to the present embodiment acquires time stamp tokens for target data from a plurality of time stamp authorities and includes the time stamp tokens in DAG data 152. Thus, the proof of existence of the target data can be ensured in a plurality of countries and/or regions.

Figure 4:
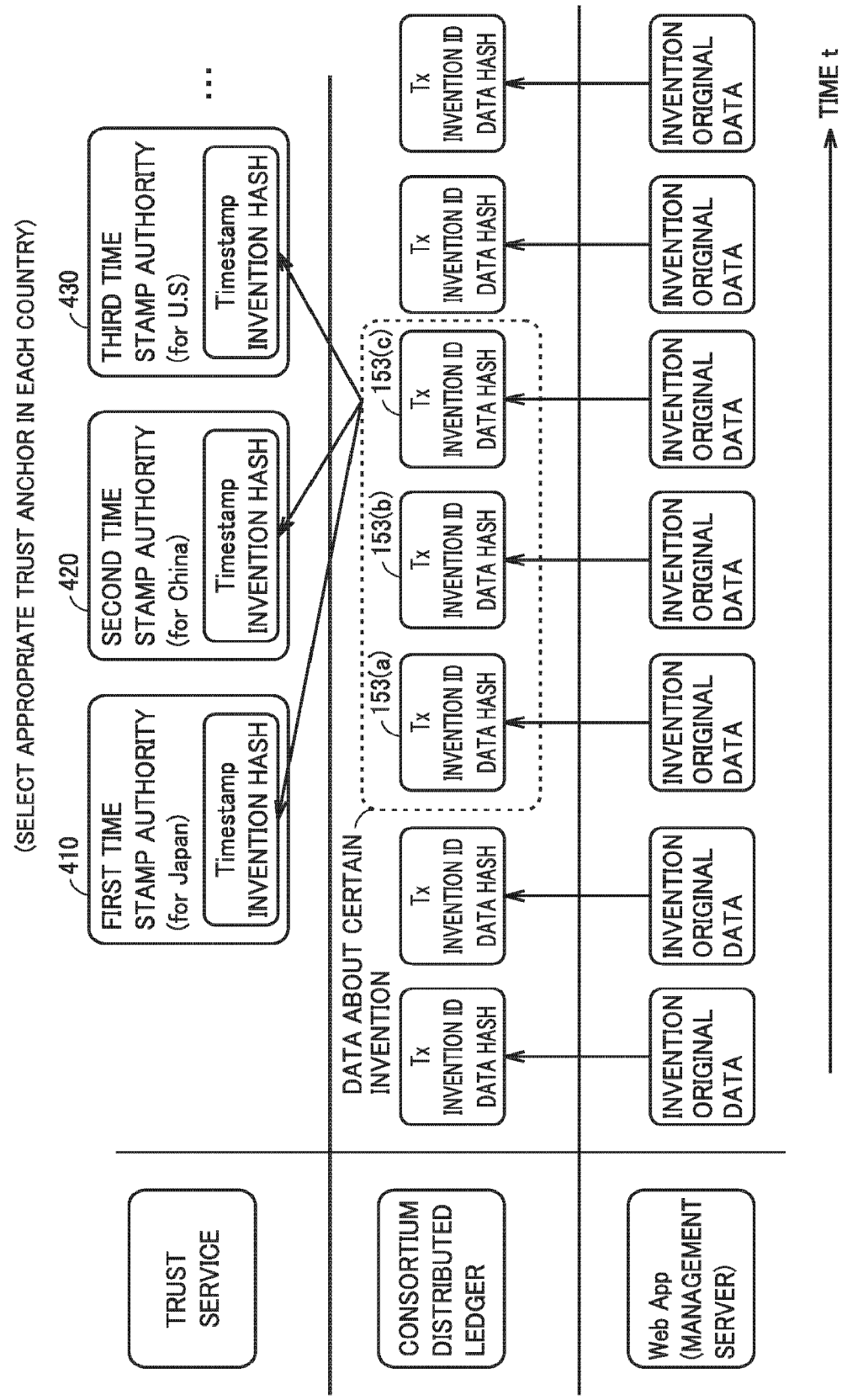
FIG. 4 is a diagram for illustrating an overview of making an application for a proof of existence (acquisition of a time stamp token).

FIG. 4 is a diagram for illustrating an overview of making an application for a proof of existence (acquisition of a time stamp token). Referring to FIG. 4, when storing intellectual-property-related data (invention original data in FIG. 4) into management server 200, data management apparatus 100 hashes the intellectual-property-related data and transmits transaction data including the hash value to network NW so as to include the data in DAG data 152. For example, when a plurality of pieces of intellectual-property-related data for a certain invention are accumulated in management server 200 and DAG data 152, an application for a proof of existence is made. In FIG. 4, when transaction data 153(c) is added to DAG data 152, an application for a proof of existence is made. When the application for a proof of existence is made, an invention hash obtained by collectively hashing the pieces of transaction data (transaction data 153(a) to 153(c) in FIG. 4) for the certain invention is generated, and the invention hash is transmitted to time stamp authority group 400. Then, each time stamp authority generates a time stamp token obtained by combining the invention hash with time information that is based on a time source having traceability in the international standard time. With this time stamp token, it can be proved that the data included in DAG data 152 has existed at that time. It should be noted that although FIG. 4 shows an example in which the pieces of transaction data for the certain invention are continuously stored in DAG data 152 (consortium distributed ledger), the pieces of transaction data for the certain invention are not limited to being continuously stored in DAG data 152. The pieces of transaction data for the certain invention may be stored in DAG data 152 in a non-continuous manner. In such a case, for example, the pieces of transaction data for the certain invention may be specified by the invention ID included in the pieces of transaction data, and may be collectively hashed to generate an invention hash. It should be noted that the "invention hash" corresponds to exemplary "hash data" according to the present disclosure.

FIG. 5 is a sequence diagram for illustrating a flow from the creation of DAG data 152 to the application for a proof of existence (acquisition of a time stamp token). In the present embodiment, the process of making the application for a proof of existence proceeds in the order of (1) to (6) shown in FIG. 5. It should be noted that a process of issuing an electronic certificate as shown in (0) is performed, for example, when data management apparatus 100 participates in network NW or the like, and the electronic certificate is issued in response to making an application to each of the certification authorities (first certification authority 310 to fourth certification authority 340).

Referring to FIG. 5, (1) the user of data management apparatus 100 performs an operation for issuing the invention ID via input apparatus 160. The invention ID is an ID for managing the intellectual-property-related data, and one invention ID is assigned to one invention in the present embodiment. The invention ID is associated with a plurality of pieces of intellectual-property-related data (document files in FIG. 5) related to the invention, thereby managing the invention. When the operation for issuing the invention ID is performed, controller 110 of data management apparatus 100 issues the invention ID, stores the invention ID into, for example, storage 150, generates transaction data for generating the transaction, and transmits the transaction data to network NW. Thus, the invention ID is stored into DAG data 152. Here, it is assumed that an invention ID "A001" is issued. It should be noted that the invention ID corresponds to exemplary "ID information" according to the present disclosure.

Next, (2) the user of data management apparatus 100 performs an operation for registering the document files (the pieces of intellectual-property-related data) via input apparatus 160. The user performs an operation to register the document files in association with the invention ID "A001". By the operation, controller 110 stores the document files in the Web (management server 200) in association with the invention ID "A001". In the example shown in FIG. 5, two document files "000001" and "000002" are stored in management server 200 in association with the invention ID "A001" It should be noted that the pieces of data (for example, the document files) associated with the invention ID are also collectively referred to as "invention information".

(3) Controller 110 hashes each of the document files, generates transaction data for registering the hash value in DAG data 152, and transmits the transaction data to network NW via communication apparatus 140. Specifically, when the document file "000001" is stored into management server 200, controller 110 generates transaction data including a hash value of the document file "000001" and transmits the transaction data to network NW via communication apparatus 140. Thus, the transaction data including the hash value of the document file "000001" is stored into DAG data 152. When the document file "000002" is stored into management server 200, controller 110 generates transaction data including a hash value of the document file "000002" and transmits the transaction data to network NW via communication apparatus 140. Thus, the transaction data including the hash value of the document file "000002" is stored into DAG data 152. It should be noted that since each of the pieces of transaction data includes the information of the invention ID "A001", the transaction data is associated with the invention ID "A001".

In a column for the consortium distributed ledger, a state of DAG data 152 at the time of making the application for the proof of existence (acquisition of the time stamp token) (at the time of (4)) is schematically shown. FIG. 5 shows a state in which the two pieces of transaction data (including the hash values of the document files "000001" and "000002" respectively) are associated with the invention ID "A001".

(4) The user of data management apparatus 100 performs an operation for making the application for the proof of existence (acquisition of the time stamp token) via input apparatus 160. When the operation for making the application for the proof of existence (acquisition of the time stamp token) is performed, controller 110 uses a hash function to collectively hash the pieces of transaction data (the transaction data including the hash value of the document file "000001" and the transaction data including the hash value of the document file "000002") associated with the invention ID "A001" A numerical value (hash value) obtained on this occasion is an "invention hash".

The operation for making an application for a proof of existence can be performed at any timing for the user.

(5) Controller 110 transmits the invention hash to time stamp authority group 400. On this occasion, controller 110 transmits the invention hash to a time stamp authority selected in the below-described interface screen in time stamp authority group 400 via communication apparatus 140.

(6) The time stamp authority having received the invention hash returns, to data management apparatus 100, a time stamp token (TST) obtained by combining the invention hash with time information that is based on a time source having traceability in the international standard time. When the time stamp token is received from the time stamp authority, controller 110 generates transaction data for registering the time stamp token in DAG data 152, and transmits the transaction data to network NW via communication apparatus 140. Thus, the time stamp token is registered in DAG data 152. Thus, the proof of existence (time stamp token) is acquired.

Controller 110 stores the invention hash and the time stamp token in storage 150, for example. Further, controller 110 transmits, to network NW, an invention certificate having the first to fourth electronic certificates accompanied therewith. The invention certificate includes the invention ID, the transaction data associated with the invention ID, the first to fourth electronic signatures, and the time stamp token. The invention certificate is used for verification of existence and verification of validation of each electronic signature as described later. It should be noted that each of the electronic certificates accompanied with the invention certificate may be only an electronic certificate corresponding to a time stamp authority for which the application for a proof of existence (acquisition of a time stamp token) has been made.

FIG. 6 is a diagram for illustrating an interface screen for making an application for a proof of existence (acquisition of the time stamp token). The interface screen shown in FIG. 6 is displayed on the display of display apparatus 170.

The interface screen includes a selection region 171, a first display region 172, a second display region 173, and a third display region 174.

Figure 10:
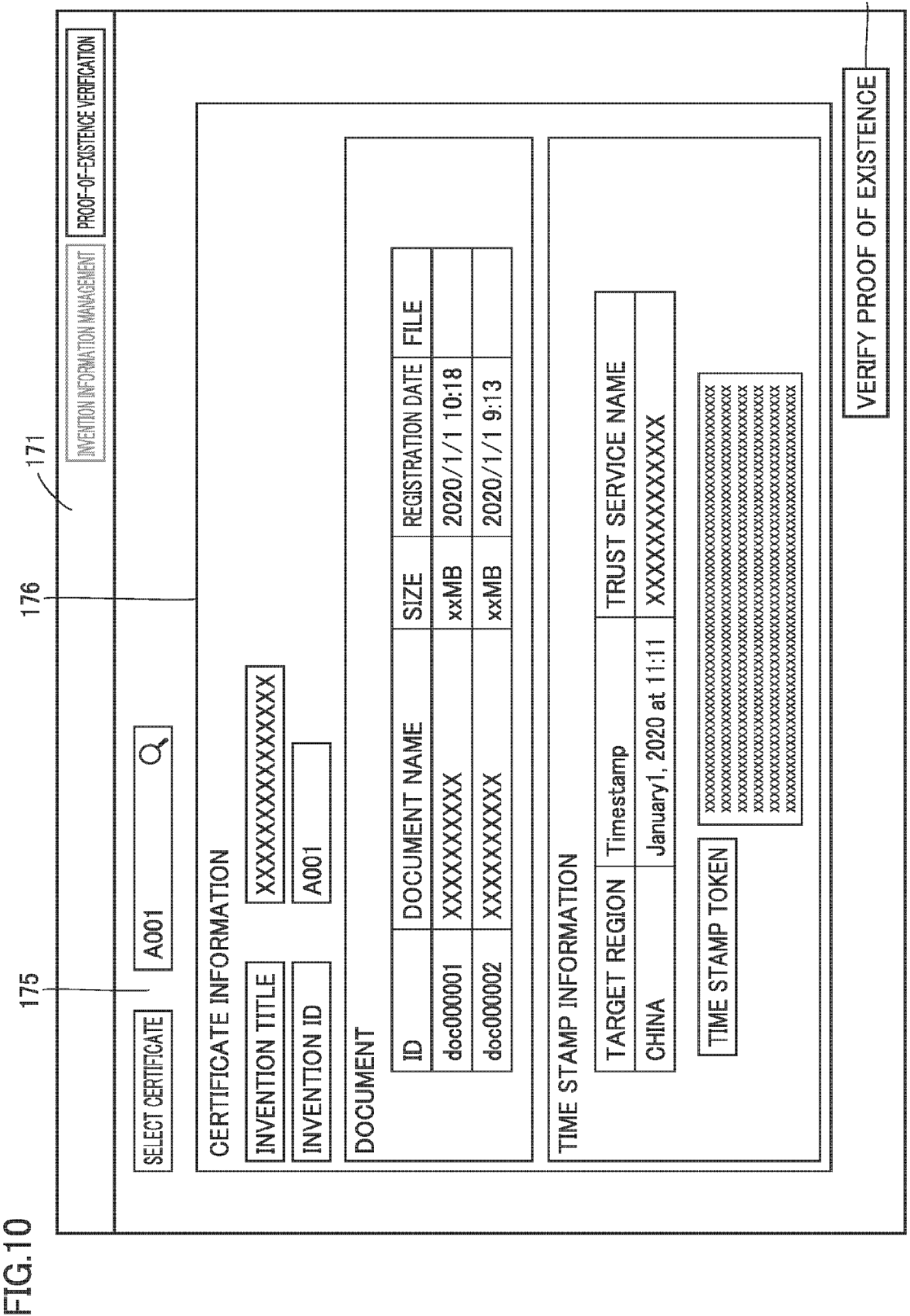
FIG. 10 is a diagram for illustrating an interface screen for verifying the proof of existence.

In selection region 171, tabs "INVENTION INFORMATION MANAGEMENT" and "PROOF-OF-EXISTENCE VERIFICATION" are displayed to be selectable. For example, by selecting the tab "INVENTION INFORMATION MANAGEMENT" or "PROOF-OF-EXISTENCE VERIFICATION" using input apparatus 160 such as a mouse, a content displayed on the interface screen can be switched. FIG. 6 shows an interface screen when "INVENTION INFORMATION MANAGEMENT" is selected. When "PROOF-OF-EXISTENCE VERIFICATION" is selected, a below-described interface screen shown in FIG. 10 is displayed on the display of display apparatus 170.

Registered invention projects are displayed in first display region 172. The invention project includes a plurality of invention IDs. In the example shown in FIG. 6, four invention IDs A001 to A004 are registered. By selecting an indication "ADD INVENTION PROJECT", an invention project, i.e., a new invention ID can be issued and added. In FIG. 6, the invention ID "A001" is selected.

In second display region 173, version information of the selected invention ID is displayed. The version information is added, for example, when a document file is newly stored or some update related to the invention ID "A001" is made.

Third display region 174 includes a display column for a title of an invention, a display column for an invention ID, a display column for a description of the invention, a display column for a document, and a display column for a proof of existence. A title of an invention is displayed in the display column for a title of an invention. The invention ID is displayed in the display column for an invention ID. In the example shown in FIG. 6, the invention ID "A001" is displayed. In the display column for a description of the invention, a description of the invention is displayed.

Document files stored in association with the invention ID are displayed in the display column for a document. In the example shown in FIG. 6, the document files "000001" and "000002" associated with the invention ID "A001" are displayed. By selecting a button (indication) "ADD FILE", a new document can be stored in association with the invention ID "A001".

The display column for a proof of existence includes: information about a country and/or region that has issued a proof of existence (timestamp token) for the invention ID "A001"; time information included in the timestamp token; and time stamp authority information (trust service name). FIG. 6 shows that the proof of existence has been issued in each of China (second time stamp authority 420), EU (fourth time stamp authority 440), and Japan (first time stamp authority 410). As described below, when a proof of existence is issued, a result thereof is displayed in the display column for a proof of existence.

Further, the display column for a proof of existence further includes a button (indication) "ISSUE PROOF OF EXISTENCE". By selecting the button "ISSUE PROOF OF EXISTENCE", a proof of existence for the invention ID "A001" can be issued (application therefor can be made). By selecting the button "PROOF OF EXISTENCE", controller 110 generates an invention hash at that time.

FIG. 7 is a diagram for illustrating an interface screen displayed when the button "ISSUE PROOF OF EXISTENCE" in FIG. 6 is selected. As shown in FIG. 7, when the button "ISSUE PROOF OF EXISTENCE" is selected, a pop-up screen 179 for selecting a country and/or region that is to issue a proof of existence is displayed. That is, pop-up screen 179 for selecting a time stamp authority that is to issue a proof of existence is displayed. In the example shown in FIG. 7, first time stamp authority 410 (Japan), second time stamp authority 420 (China), and fourth time stamp authority 440 (EU) are selected. By selecting the button (indication) "ISSUE PROOF OF EXISTENCE" shown in FIG. 7 in a state in which the above are selected, the invention hash is transmitted to the selected time stamp authorities. Thus, time stamp tokens can be acquired from the selected time stamp authorities. Information of each of the time stamp tokens acquired from the selected time stamp authorities is displayed in the display column for a proof of existence in FIG. 6.

Figure 8:
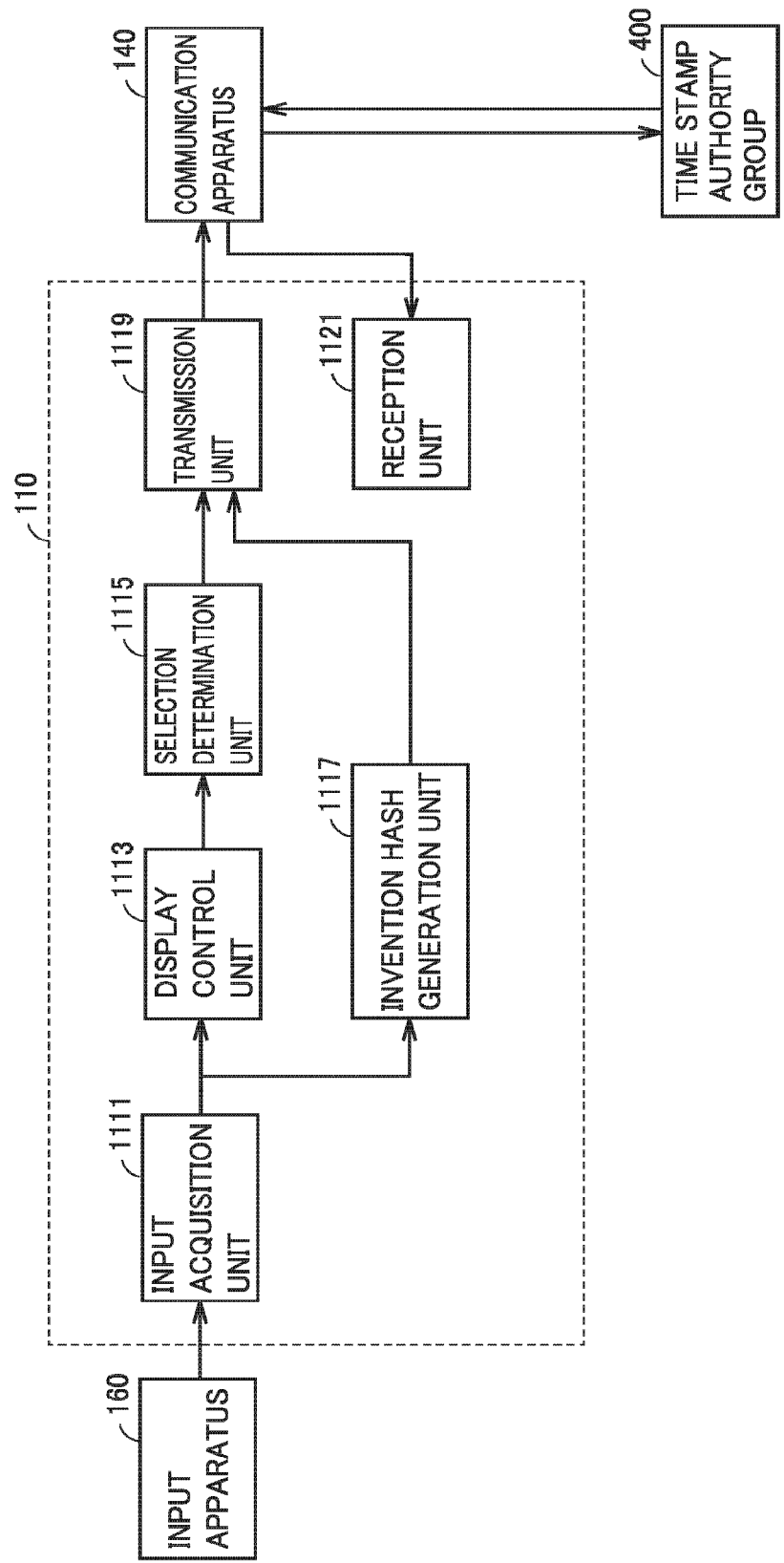
FIG. 8 is a functional block diagram of the controller for illustrating the application for a proof of existence (acquisition of a time stamp token).

FIG. 8 is a functional block diagram of controller 110 for illustrating an application for a proof of existence (acquisition of a time stamp token). Referring to FIG. 8, controller 110 includes an input acquisition unit 1111, a display control unit 1113, a selection determination unit 1115, an invention hash generation unit 1117, a transmission unit 1119, and a reception unit 1121. For example, controller 110 executes a program stored in ROM 120 so as to function as each of input acquisition unit 1111, display control unit 1113, selection determination unit 1115, invention hash generation unit 1117, transmission unit 1119, and reception unit 1121. It should be noted that each of input acquisition unit 1111, display control unit 1113, selection determination unit 1115, invention hash generation unit 1117, transmission unit 1119, and reception unit 1121 may be implemented by dedicated hardware (electronic circuit), for example.

Input acquisition unit 1111 detects that an operation for making an application for (issuing) a proof of existence has been performed via input apparatus 160. Specifically, from input apparatus 160, input acquisition unit 1111 acquires information indicating that the button "ISSUE PROOF OF EXISTENCE" displayed on the interface screen (FIG. 6) of display apparatus 170 has been selected. When the information is acquired, input acquisition unit 1111 outputs a control signal to display control unit 1113 so as to instruct to display the pop-up, and outputs a control signal to invention hash generation unit 1117 so as to instruct to generate an invention hash.

When the control signal to instruct to display the pop-up is acquired from input acquisition unit 1111, display control unit 1113 controls display apparatus 170 to display the pop-up screen (FIG. 7) for selecting each of time stamp authorities that are each to issue a proof of existence.

Selection determination unit 1115 determines the time stamp authority selected on the pop-up screen. When the button "ISSUE PROOF OF EXISTENCE" displayed on the pop-up screen is selected, selection determination unit 1115 outputs transmission information, which is information for specifying the selected time stamp authority, to transmission unit 1119.

When the control signal to instruct to generate an invention hash is acquired from input acquisition unit 1111, invention hash generation unit 1117 collectively hashes the pieces of transaction data associated with the selected invention ID to generate an invention hash. Invention hash generation unit 1117 outputs the generated invention hash to transmission unit 1119.

Transmission unit 1119 outputs, to communication apparatus 140, a control signal for transmitting the invention hash to the time stamp authority specified by the transmission information received from selection determination unit 1115. Thus, the invention hash is transmitted to the selected time stamp authority via communication apparatus 140.

Each time stamp authority having received the invention hash returns a time stamp token to data management apparatus 100.

Reception unit 1121 receives the time stamp token via communication apparatus 140 from each time stamp authority to which the invention hash has been transmitted. Thus, the proof of existence of the invention information of the invention ID, which is a target for the application for the proof of existence, can be acquired.

<Verification of Proof of Existence>

Figure 9:
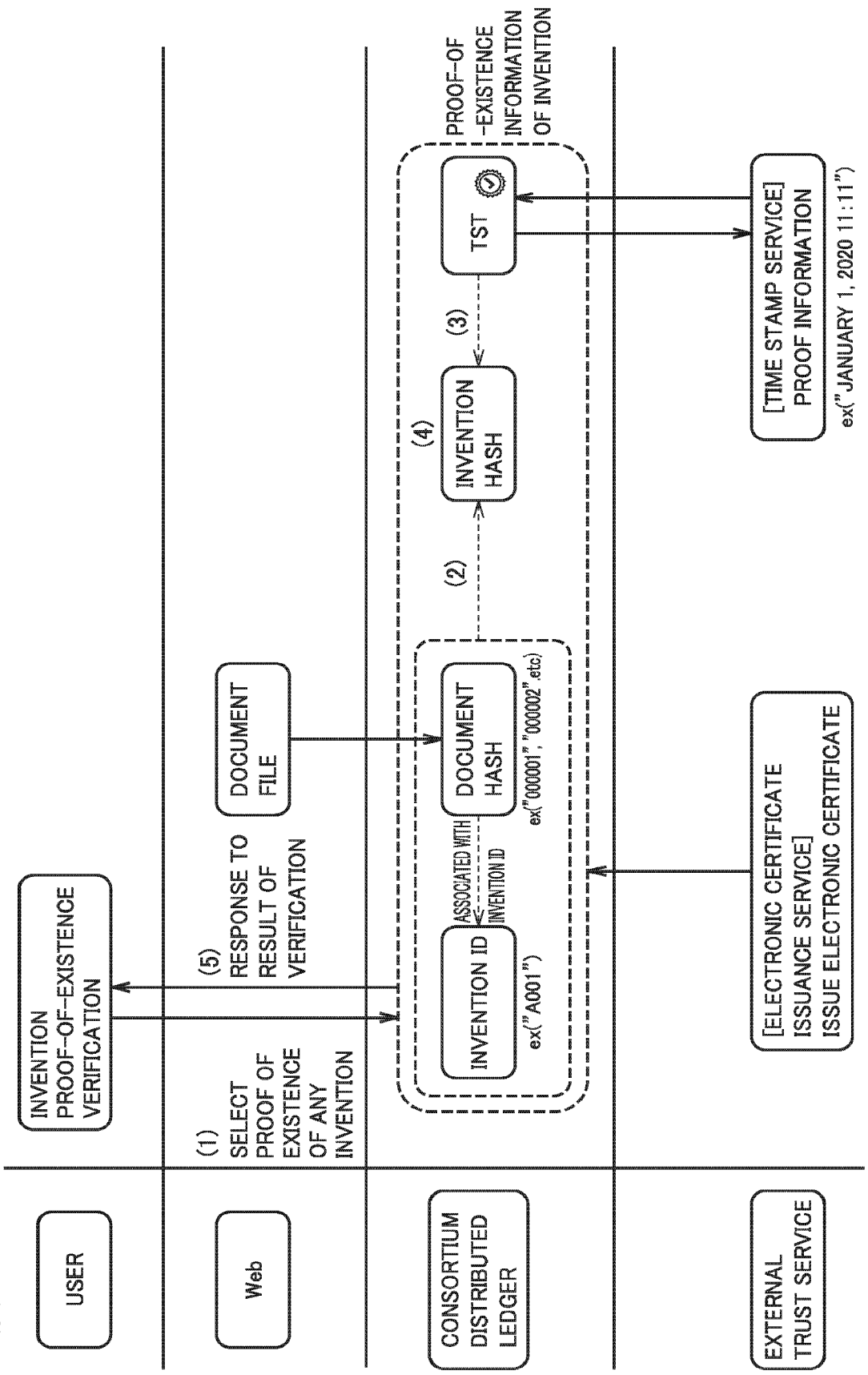
FIG. 9 is a sequence diagram for illustrating a flow of verification of the proof of existence.

FIG. 9 is a sequence diagram for illustrating a flow of verification of a proof of existence. In the present embodiment, a process of verifying a proof of existence proceeds in the order of (1) to (5) shown in FIG. 9.

(1) The user of data management apparatus 100 selects any invention (invention ID) via input apparatus 160, and performs an operation for verifying a proof of existence of the invention.

FIG. 10 is a diagram for illustrating an interface screen for verifying the proof of existence. The interface screen shown in FIG. 10 is displayed on the display of display apparatus 170. The interface screen includes a selection region 171, a fourth display region 175, a fifth display region 176, and a sixth display region 177. Selection region 171 is the same as the interface screen for making an application for a proof of existence as illustrated in FIG. 6. The interface screen of FIG. 6 can be displayed by selecting the tab "INVENTION INFORMATION MANAGEMENT" displayed in selection region 171, and the interface screen of FIG. 10 can be displayed by selecting the tab "PROOF-OF-EXISTENCE VERIFICATION".

In fourth display region 175, an input region for searching for an invention to be verified in proof of existence is displayed. For example, by inputting the invention ID "A001" to the input region, information of the invention ID "A001" can be displayed in fifth display region 176. FIG. 10 shows a display screen in which the invention ID "A001" has been searched for.

In fifth display region 176, the information of the invention ID ("A001") having been searched for is displayed. Sixth display region 177 includes a button (indication) "VERIFY PROOF OF EXISTENCE". By selecting the button "VERIFY PROOF OF EXISTENCE", verification of the proof of existence of the invention information of the invention ID displayed in fifth display region 176 is started.

Referring again to FIG. 9, (2) controller 110 of data management apparatus 100 generates an invention hash by collectively hashing pieces of transaction data associated with the selected invention ID.

(3) Controller 110 reads out the time stamp token from storage 150. Then, controller 110 reads out the invention hash included in the time stamp token.

(4) Controller 110 compares the generated invention hash with the invention hash included in the time stamp token, and confirms that they coincide with each other. By confirming that they coincide with each other, it is possible to prove that the invention information of the invention ID ("A001" in the example shown in FIG. 9) has not been tampered with during a period of time from the issuance of the time stamp token to the present time.

(5) Controller 110 displays a result of verification of the proof of existence on, for example, the display of display apparatus 170.

Figure 11:
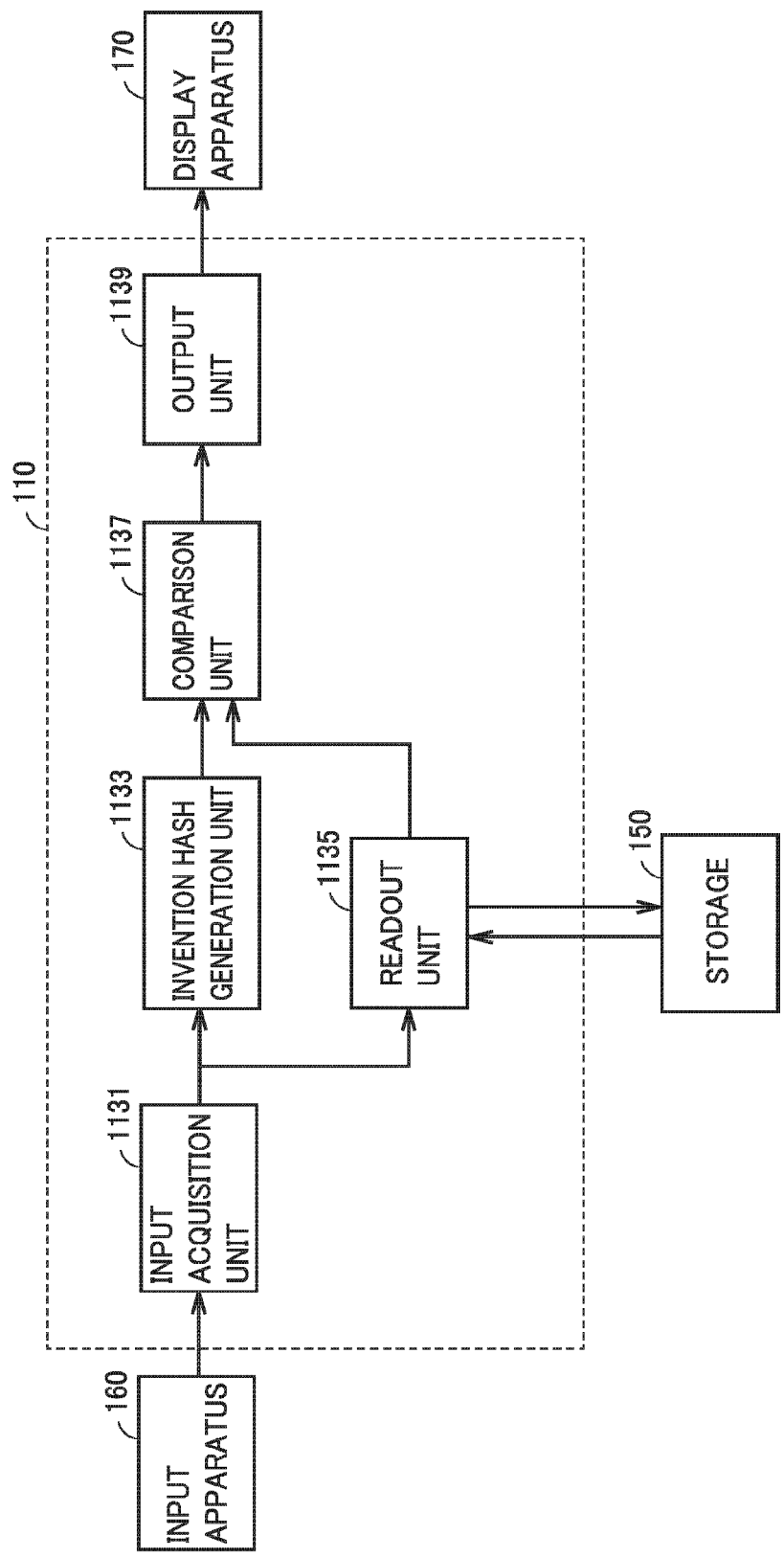
FIG. 11 is a functional block diagram of the controller for illustrating the verification of the proof of existence.

FIG. 11 is a functional block diagram of controller 110 for illustrating verification of a proof of existence. Referring to FIG. 11, controller 110 includes an input acquisition unit 1131, an invention hash generation unit 1133, a readout unit 1135, a comparison unit 1137, and an output unit 1139. For example, controller 110 executes a program stored in ROM 120 so as to function as each of input acquisition unit 1131, invention hash generation unit 1133, readout unit 1135, comparison unit 1137, and output unit 1139. It should be noted that each of input acquisition unit 1131, invention hash generation unit 1133, readout unit 1135, comparison unit 1137, and output unit 1139 may be implemented by dedicated hardware (electronic circuit), for example.

Via input apparatus 160, input acquisition unit 1131 detects that an operation for verifying a proof of existence has been performed. Specifically, from input apparatus 160, input acquisition unit 1131 acquires information indicating that the button "VERIFY PROOF OF EXISTENCE" displayed on display apparatus 170 has been selected. When the information is acquired, input acquisition unit 1131 outputs a control signal to invention hash generation unit 1133 so as to instruct to generate an invention hash, and outputs a control signal to readout unit 1135 so as to instruct to read out the time stamp token.

When the control signal to instruct to generate an invention hash is acquired from input acquisition unit 1131, invention hash generation unit 1133 collectively hashes the pieces of transaction data associated with the selected invention ID to generate an invention hash. Invention hash generation unit 1133 outputs the generated invention hash to comparison unit 1137.

When the control signal to instruct to read out the time stamp token from input acquisition unit 1131, readout unit 1135 reads out the time stamp token of the selected invention ID stored in storage 150. Readout unit 1135 reads out the invention hash from the read-out time stamp token, and outputs the read-out invention hash to comparison unit 1137.

Comparison unit 1137 compares the invention hash received from invention hash generation unit 1133 with the invention hash received from readout unit 1135. When they coincide with each other, comparison unit 1137 determines that the invention information of the invention ID has not been tampered with during a period of time from the issuance of the time stamp token to the present time. When they do not coincide with each other, comparison unit 1137 determines that the invention information of the invention ID has been tampered with during the period of time from the issuance of the time stamp token to the present time. Comparison unit 1137 outputs the result of comparison to output unit 1139.

Output unit 1139 outputs the result of comparison to display apparatus 170, for example. Thus, the result of verification of the proof of existence of the selected invention ID is displayed on display apparatus 170.

<Verification of Validities of Electronic Signatures>

Referring again to FIG. 9, when the process of (1) is performed, i.e., when the operation for selecting an invention ID and verifying a proof of existence thereof is performed, controller 110 of data management apparatus 100 verifies validities of the electronic signatures in parallel with the verification of the proof of existence or before or after the verification of the proof of existence.

First, controller 110 decodes the electronic signatures (first to fourth electronic signatures) of the transaction data associated with the invention ID (in the example shown in FIG. 9, "A001") using the first to fourth public keys included in the first to fourth electronic certificates accompanied with the invention certificate. As described above, since the invention certificate includes the invention ID, the transaction data associated with the invention ID, the first to fourth electronic signatures, and the time stamp tokens, controller 110 can check the selected invention ID against the invention ID included in the invention certificate so as to specify the invention certificate to be used.

Controller 110 decodes the first to fourth electronic signatures using the first to fourth public keys, respectively. For each electronic signature, controller 110 compares the decoded value with the hash value of the target data (document) included in the transaction data associated with the invention ID, and confirms that they coincide with each other. By confirming that they coincide with each other, the validity of the electronic signature is recognized.

It should be noted that controller 110 may verify a validity of an electronic signature corresponding to a target country or region for the verification of the proof of existence, and may not verify a validity of an electronic signature corresponding to a non-target country or region for the verification of the proof of existence. The target country or region for the verification is a country or region selected in making the application for a proof of existence (selected in FIG. 7). For example, when the target countries or regions for the verification of the proof of existence of the selected invention ID are Japan, China, and EU, i.e., when the time stamp tokens are acquired at first time stamp authority 410, second time stamp authority 420, and fourth time stamp authority 440, controller 110 may verify the validities of the first electronic signature, the second electronic signature, and the fourth electronic signature and may not verify the validity of the third electronic signature. Thus, a processing load can be reduced as compared with a case of verifying not only the validity of the electronic signature corresponding to the target country or region for the verification of the proof of existence but also the validity of the electronic signature corresponding to the non-target country or region for the verification of the proof of existence.

Figure 12:
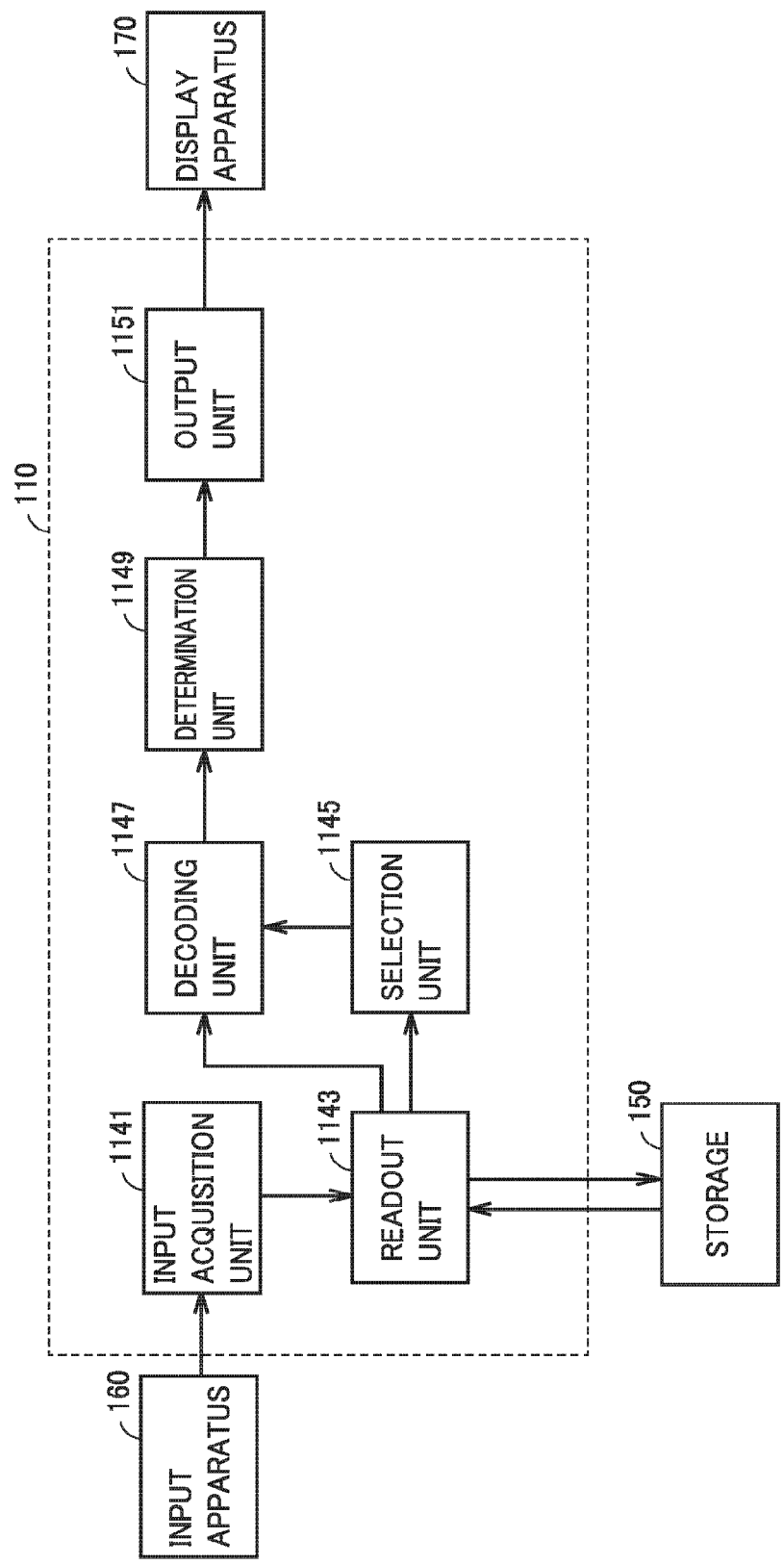
FIG. 12 is a functional block diagram of the controller for illustrating verification of a validity of an electronic signature.

FIG. 12 is a functional block diagram of controller 110 for illustrating verification of a validity of an electronic signature. Referring to FIG. 12, controller 110 includes an input acquisition unit 1141, a readout unit 1143, a selection unit 1145, a decoding unit 1147, a determination unit 1149, and an output unit 1151. For example, controller 110 executes a program stored in ROM 120 so as to function as each of input acquisition unit 1141, readout unit 1143, selection unit 1145, decoding unit 1147, determination unit 1149, and output unit 1151. It should be noted that each of input acquisition unit 1141, readout unit 1143, selection unit 1145, decoding unit 1147, determination unit 1149, and output unit 1151 may be implemented by dedicated hardware (electronic circuit), for example.

Via input apparatus 160, input acquisition unit 1141 detects that an operation for verifying a proof of existence has been performed. Specifically, from input apparatus 160, input acquisition unit 1141 acquires information indicating that the button "VERIFY PROOF OF EXISTENCE" displayed on display apparatus 170 has been selected. When the information is acquired, input acquisition unit 1141 specifies the target invention ID, and outputs, to readout unit 1143, the specified invention ID and a control signal to instruct to read out the transaction data associated with the invention ID.

When the invention ID and the control signal to instruct to read out the transaction data associated with the invention ID are acquired from input acquisition unit 1141, readout unit 1143 reads out the transaction data associated with the invention ID from storage 150. Further, readout unit 1143 reads out the invention certificate corresponding to the invention ID from storage 150. Readout unit 1143 outputs the read-out invention certificate to selection unit 1145, and outputs the read-out transaction data and invention certificate to decoding unit 1147.

Selection unit 1145 selects an electronic signature to be verified in validity. From the time stamp token included in the invention certificate, selection unit 1145 specifies a target country or region for the verification of the proof of existence, for example. Then, selection unit 1145 selects an electronic signature corresponding to the specified country or region. Specifically, for example, when the invention certificate includes the time stamp tokens issued by first time stamp authority 410, second time stamp authority 420, and fourth time stamp authority 440, selection unit 1145 select, as the electronic signatures to be verified in validity, the first electronic signature, the second electronic signature, and the fourth electronic signature corresponding to first certification authority 310, second certification authority 320, and fourth certification authority 340, which are certification authorities of the countries or regions corresponding to first time stamp authority 410, second time stamp authority 420, and fourth time stamp authority 440, respectively. Selection unit 1145 outputs, to decoding unit 1147, a signal indicating each of the selected electronic signatures, i.e., each of the electronic signatures to be decoded.

Decoding unit 1147 decodes the target electronic signatures using the electronic certificates accompanied with the invention certificate. Specifically, decoding unit 1147 decodes, with the first electronic certificate (first public key), the second electronic certificate (second public key), and the fourth electronic certificate (fourth public key), the target electronic signatures (here, the first electronic signature, the second electronic signature, and the fourth electronic signature) of the electronic signatures attached to the transaction data received from input acquisition unit 1141, respectively. Decoding unit 1147 outputs each decoded value (decoded value) to determination unit 1149. Decoding unit 1147 outputs the transaction data received from readout unit 1143 to determination unit 1149. It should be noted that the transaction data may be sent from readout unit 1143 to determination unit 1149.

Determination unit 1149 compares each of the decoded values received from decoding unit 1147 with the hash value of the document file included in the transaction data. When they coincide with each other, determination unit 1149 determines that the electronic signature is valid. When they do not coincide with each other, determination unit 1149 determines that the electronic signature is not valid. Determination unit 1149 outputs the result of determination to output unit 1151.

Output unit 1151 outputs the result of determination to, for example, display apparatus 170. Thus, the result of verification of the validity of the electronic signature is displayed on display apparatus 170.

<Processes Performed by Controller>
<<Generation of Transaction Data>>

Figure 13:
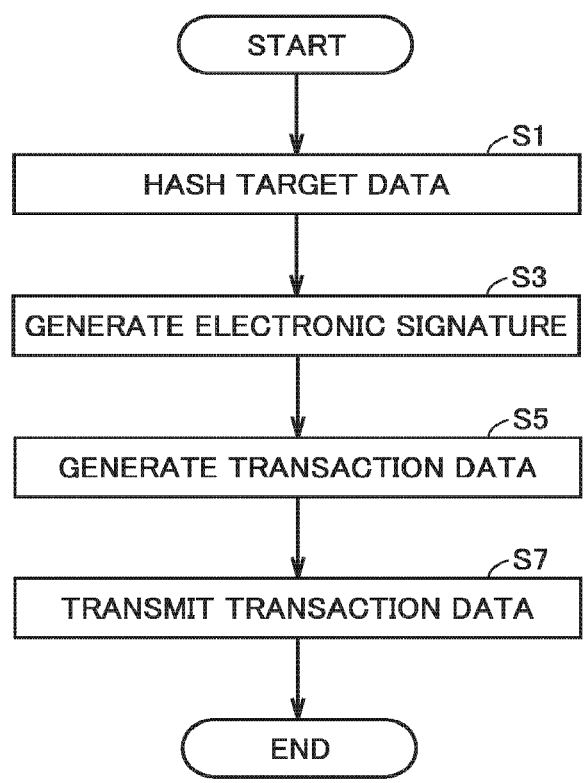
FIG. 13 is a flowchart showing a procedure of a process of generating transaction data.

FIG. 13 is a flowchart showing a procedure of a process of generating transaction data. The process of the flowchart shown in FIG. 13 is performed by controller 110 whenever an input operation via input apparatus 160 is performed or whenever a time stamp token is acquired from time stamp authority group 400. The input operation is, for example, an operation of newly storing intellectual-property-related data. It should be noted that the following describes a case where each step (hereinafter, the term "step" will be abbreviated as "S") of the flowcharts shown in FIG. 13 and FIGS. 14, 15, and 16 described later is implemented by software processing by controller 110; however, part or whole of the steps may be implemented by hardware (electronic circuit) fabricated in controller 110.

In S1, controller 110 hashes target data. Specifically, when recording intellectual-property-related data, controller 110 reads out the intellectual-property-related data (target data) from management server 200, and hashes the target data using a hash function. Alternatively, when recording a time stamp token, controller 110 hashes the time stamp token (target data) using a hash function.

In S3, controller 110 reads out the first to fourth private keys from storage 150. Then, controller 110 encodes the hashed target data using the first to fourth private keys to generate the first to fourth electronic signatures, respectively.

In S5, controller 110 generates transaction data with the hash value of the target data and the four electronic signatures (the first electronic signature, the second electronic signature, the third electronic signature, and the fourth electronic signature) being included therein. It should be noted that in addition to those described above, controller 110 includes, in the transaction data, invention ID information, a time information of broadcasting the transaction data to network NW (the time information may be time information indicating a time of occurrence of a process corresponding to the transaction data), and transmitter information for the transaction data. Further, controller 110 approves pieces of transaction data of two transactions having occurred in past, and includes hash values of these pieces of transaction data in the foregoing transaction data.

It should be noted that in S5, controller 110 may generate four pieces of transaction data, i.e., transaction data including the hash value of the target data and the first electronic signature, transaction data including the hash value of the target data and the second electronic signature, transaction data including the hash value of the target data and the third electronic signature, and transaction data including the hash value of the target data and the fourth electronic signature. It should be noted that each of the four pieces of transaction data also includes the invention ID information, the time information of broadcasting the transaction data to network NW, the transmitter information for the transaction data, and the hash values of the pieces of transaction data of the two transactions having occurred in past.

In S7, controller 110 outputs, to communication apparatus 140, a control signal for transmitting the generated transaction data to network NW. Thus, the transaction data is transmitted to network NW via communication apparatus 140.

<<Application for Proof of Existence>>

Figure 14:
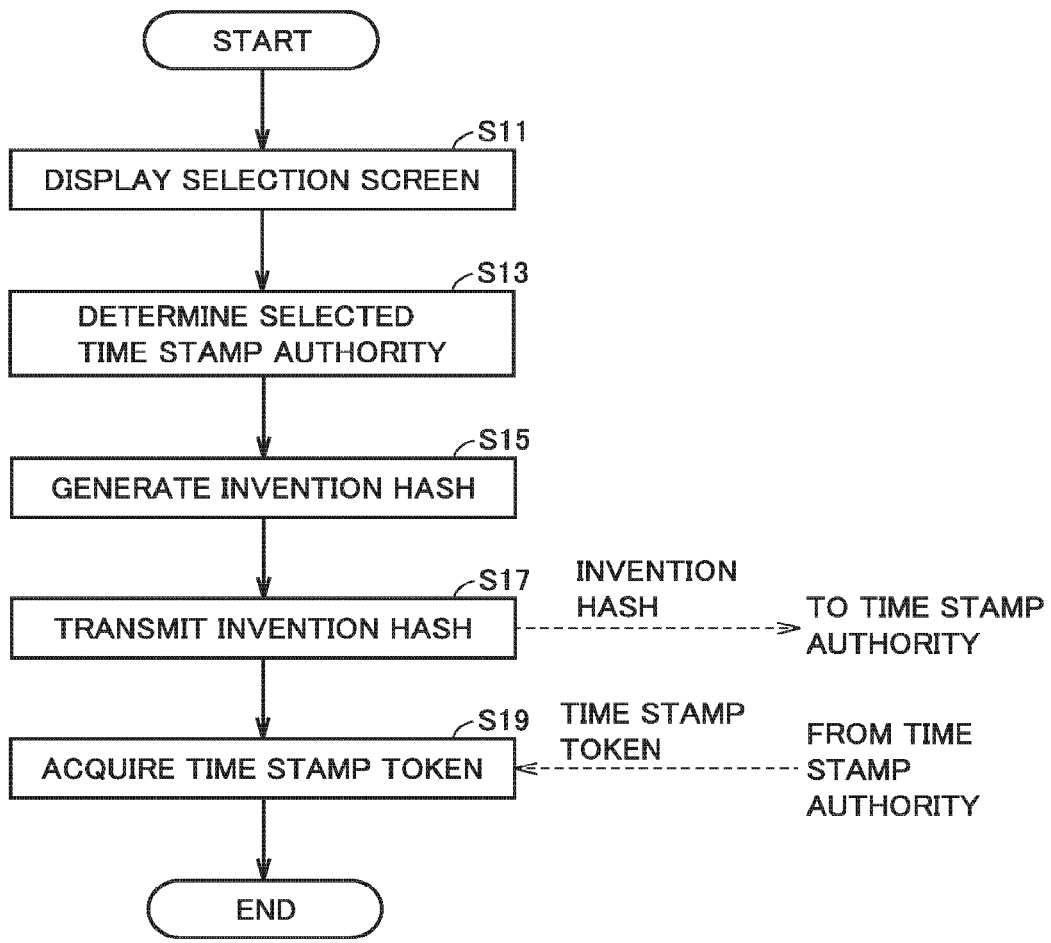
FIG. 14 is a flowchart showing a procedure of a process of making an application for a proof of existence of invention information.

FIG. 14 is a flowchart showing a procedure of a process of making an application for a proof of existence of invention information. The process of the flowchart shown in FIG. 14 is performed by controller 110 whenever an operation for making an application for a proof of existence is performed via input apparatus 160. In the present embodiment, an application for a proof of existence is performed based on each invention ID as a unit.

In S11, controller 110 controls display apparatus 170 to display the pop-up screen for selecting a time stamp authority that is to issue a proof of existence.

In S13, controller 110 determines the time stamp authority selected on the pop-up screen.

In S15, controller 110 collectively hashes the pieces of transaction data associated with the invention ID that is a target for the application for a proof of existence, so as to generate an invention hash. It should be noted that the process of S15 may be performed before the process of S11.

In S17, controller 110 outputs, to communication apparatus 140, a control signal for transmitting the invention hash to the selected time stamp authority. Thus, the invention hash is transmitted to the selected time stamp authority via communication apparatus 140.

In S19, controller 110 receives a time stamp token via communication apparatus 140 from the time stamp authority to which the invention hash has been transmitted. Thus, the proof of existence of the invention information of the invention ID, which is the target for the application for the proof of existence, is acquired.

<<Verification of Proof of Existence>>

Figure 15:
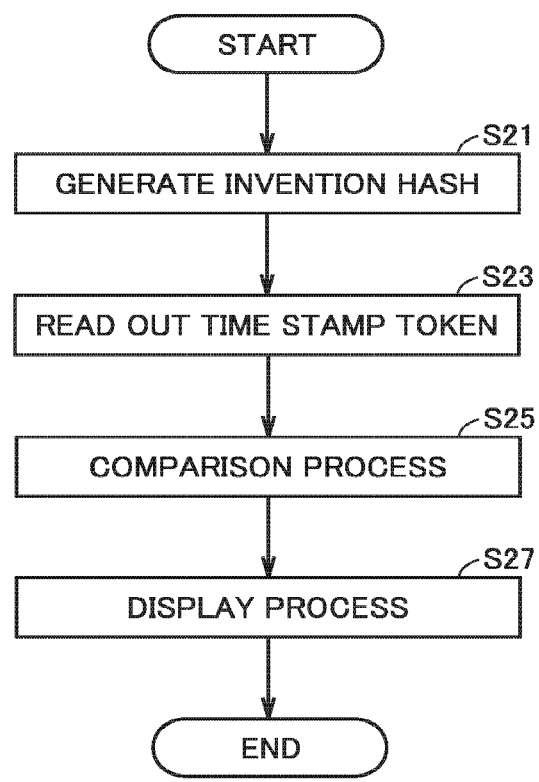
FIG. 15 is a flowchart showing a procedure of a process of verifying the proof of existence.

FIG. 15 is a flowchart showing a procedure of a process of verifying a proof of existence. The process of the flowchart shown in FIG. 15 is performed by controller 110 whenever an operation for verifying a proof of existence is performed via input apparatus 160.

In S21, controller 110 collectively hashes pieces of transaction data associated with an invention ID selected in an operation for verifying a proof of existence, so as to generate an invention hash.

In S23, controller 110 reads out a time stamp token of the invention ID selected in the operation for verifying a proof of existence from storage 150. Then, controller 110 reads out an invention hash from the read time stamp token.

In S25, controller 110 compares the invention hash generated in S21 with the invention hash read out in S23.

In S27, controller 110 displays the result of comparison in S25 on the display of display apparatus 170, for example. Thus, the result of verification of the proof of existence for the selected invention ID is displayed on display apparatus 170.

<<Verification of Validation of Electronic Signature>>

Figure 16:
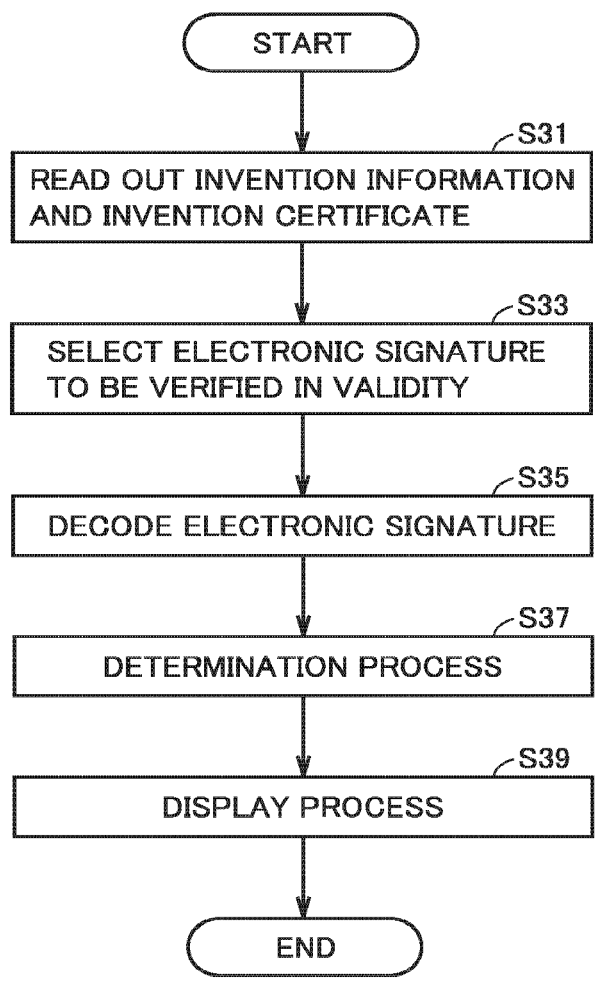
FIG. 16 is a flowchart showing a procedure of a process of verifying a validity of an electronic signature.

FIG. 16 is a flowchart showing a procedure of a process of verifying a validity of an electronic signature. The process of the flowchart shown in FIG. 16 is performed by controller 110 whenever an operation for verifying a proof of existence is performed via input apparatus 160. The process of this flowchart may be performed in parallel with the process of the flowchart of FIG. 15, or may be performed before or after the process of the flowchart of FIG. 15 is performed.

In S31, controller 110 reads out, from storage 150, transaction data associated with the invention ID selected in the operation for verifying the proof of existence. Further, controller 110 reads out, from storage 150, the invention certificate of the invention ID selected in the operation for verifying a proof of existence.

In S33, controller 110 selects an electronic signature to be verified in validity. Controller 110 specifies a target country or region for the verification of the proof of existence from the time stamp token included in the invention certificate.

In S35, controller 110 decodes the electronic signature using an electronic certificate accompanied with the invention certificate. Specifically, controller 110 decodes each of the target electronic signatures (for example, the first electronic signature, the second electronic signature, and the fourth electronic signature) for the validation among the first to fourth electronic signatures included in one piece of transaction data, using a corresponding electronic certificate (for example, the first electronic certificate, the second electronic certificate, and the fourth electronic certificate). The process of S35 is performed for all the pieces of transaction data associated with the invention ID.

In S37, controller 110 compares each decoded value with the hash value of the document file included in the transaction data. When they coincide with each other, controller 110 determines that the electronic signature is valid. When they do not coincide with each other, controller 110 determines that the electronic signature is not valid.

In S39, controller 110 displays the result of determination in S37 on the display of display apparatus 170, for example. Thus, the result of verification of the validity of the electronic signature is displayed on display apparatus 170.

As described above, in data management system 1 according to the present embodiment, when recording the invention information, data management apparatus 100 transmits the invention hash of the invention information to time stamp authority group 400. Time stamp authority group 400 includes the plurality of time stamp authorities (first to fourth time stamp authorities 410 to 440 in the embodiment). Data management apparatus 100 acquires the time stamp tokens from the plurality of time stamp authorities. Thus, accuracy of the time of recording of the invention information can be guaranteed in a plurality of countries and regions.

Further, in data management system 1 according to the present embodiment, data management apparatus 100 can select, from time stamp authority group 400, a time stamp authority from which a time stamp token is to be acquired. For a certain invention, there may be a country or region for which no time stamp token needs to be acquired. Since a time stamp authority from which a time stamp token is to be acquired can be selected, a time stamp token can be avoided from being acquired from a time stamp authority from which no time stamp token needs to be acquired, thereby reducing a processing load of data management system 1.

In data management system 1 according to the present embodiment, data management apparatus 100 acquires an electronic certificate from each of the certification authorities included in certification authority group 300. Specifically, data management apparatus 100 acquires the first electronic certificate from first certification authority 310, the second electronic certificate from second certification authority 320, the third electronic certificate from third certification authority 330, and the fourth electronic certificate from fourth certification authority 340. Data management apparatus 100 transmits, to network NW, the first to fourth electronic certificates accompanied with the invention certificate. Data management apparatus 100 generates the first to fourth electronic signatures using the first to fourth private keys, respectively, and includes the four electronic signatures in the transaction data. Although a validity of an electronic signature may differ among countries or regions due to a difference between the standards, it is possible to prove the validities of the electronic signatures in a plurality of countries and/or regions because the four electronic signatures, i.e., the first to fourth electronic signatures are included in the transaction data. Thus, reliability of the data to be transmitted to network NW is increased, thereby suppressing spoofing by a third party and tampering of data.

Further, a validity of an electronic signature corresponding to a target country or region for the verification of the proof of existence may be verified, and a validity of an electronic signature corresponding to a non-target country or region for the verification of the proof of existence may not be verified. Thus, a processing load of data management system 1 can be reduced as compared with a case of verifying not only the validity of the electronic signature corresponding to the target country or region for the verification of the proof of existence but also the validity of the electronic signature corresponding to the non-target country or region for the verification of the proof of existence.

Modification

In the embodiment, it has been illustratively described that one piece of transaction data includes the four electronic signatures (the first electronic signature, the second electronic signature, the third electronic signature, and the fourth electronic signature). However, a plurality of pieces of transaction data may be generated in accordance with the number of electronic signatures. That is, for one process for the target data, four pieces of transaction data, i.e., transaction data including the first electronic signature, transaction data including the second electronic signature, transaction data including the third electronic signature, and transaction data including the fourth electronic signature may be generated. Also with such a configuration, since the four pieces of transaction data are generated for one process for the target data, the validities of the electronic signatures can be proved in the plurality of countries and/or regions.

It should be noted that in the modification, when making an application for a proof of existence (when acquiring a time stamp token), data (for example, an invention hash) including an electronic signature of a certification authority corresponding to a time stamp authority is transmitted to the time stamp authority. Specifically, data including the first electronic signature of first certification authority 310 is transmitted to first time stamp authority 410. Data including the second electronic signature of second certification authority 320 is transmitted to second time stamp authority 420. Data including the third electronic signature of third certification authority 330 is transmitted to third time stamp authority 430. Data including the fourth electronic signature of fourth certification authority 340 is transmitted to fourth time stamp authority 440. Thus, it is possible to guarantee the validities of the electronic signatures attached to the data for which the application for a proof of existence has been made.

The modification can also be applied to a below-described second embodiment.

Second Embodiment

Figure 17:
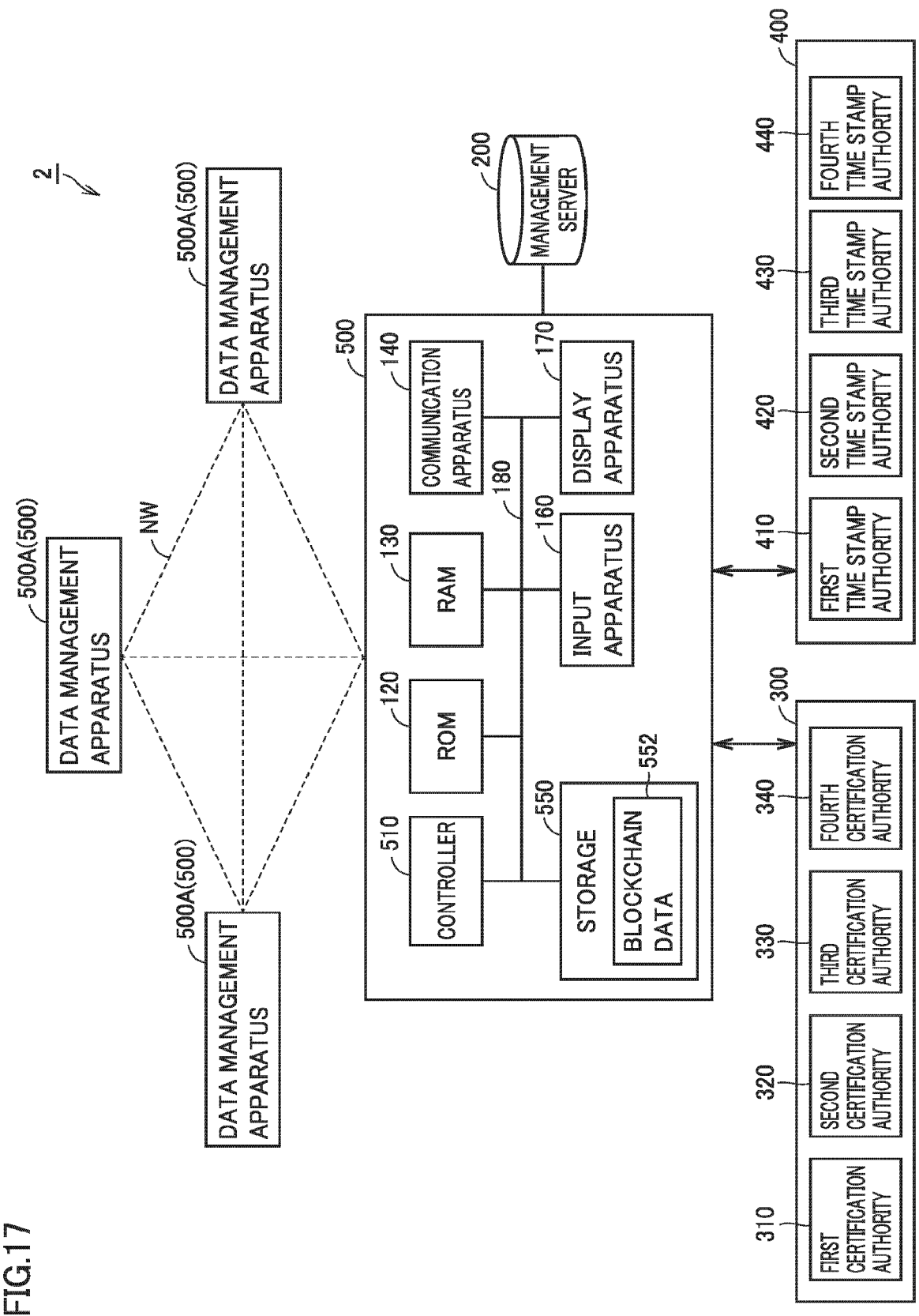
FIG. 17 is a diagram showing a schematic configuration of a data management system according to a second embodiment.

FIG. 17 is a diagram showing a schematic configuration of a data management system 2 according to a second embodiment. Data management system 2 according to the second embodiment is a system for forming a network NW (blockchain network) between a plurality of companies to manage intellectual-property-related data such as patent. A distributed ledger technology using blockchain is applied to data management system 2. Data management system 2 basically has the same configuration as that of data management system 1 according to the first embodiment. Therefore, in the second embodiment, matters about the blockchain, which is a difference from the first embodiment, will be described. It should be noted that the same configurations as those of data management system 1 according to the first embodiment are denoted by the same reference characters, and will not be described repeatedly.

Data management system 2 includes four data management apparatuses 500, a certification authority group 300, and a time stamp authority group 400. As with the first embodiment, four data management apparatuses 500 are data management apparatuses belonging to different companies (for example, a company A, a company B, a company C, and a company D). In FIG. 17, data management apparatus 500 of company A is denoted as a data management apparatus 500, and data management apparatuses 500 of company B, company C, and company D are each denoted as a data management apparatus 500A. Hereinafter, data management apparatus 500 of company A will be representatively described, but each of data management apparatuses 500A also has the same function.

Data management apparatus 500 is, for example, a desktop PC, a laptop PC, a tablet terminal, a smartphone, or another information processing terminal having a communication function. Data management apparatus 500 includes a controller 510, a ROM 120, a RANI 130, a communication apparatus 140, a storage 550, an input apparatus 160, and a display apparatus 170. Controller 510, ROM 120, RAM 130, communication apparatus 140, storage 550, input apparatus 160, and display apparatus 170 are connected to a bus 180. A management server 200 is communicatively connected to data management apparatus 500.

Controller 510 is constituted of, for example, an integrated circuit including a CPU. Controller 510 deploys, in RAM 130, various types of programs stored in ROM 120 and executes them. Controller 510 has a function of generating private keys (for example, first to fourth private keys) and public keys (for example, first to fourth public keys) in conformity with a plurality of standards (for example, the Japan standard, the China standard, the US standard, the EU standard, and the like).

Storage 550 includes, for example, a storage medium such as a hard disk or a flash memory. Storage 550 stores blockchain data 552. It should be noted that blockchain data 552 is not limited to being stored in storage 550, and may be stored in ROM 120, RAM 130, or management server 200. Storage 550 stores the private keys and the public keys generated by controller 510. Storage 550 stores electronic certificates issued from a plurality of certification authorities included in certification authority group 300. It should be noted that the private keys, the public keys, and the electronic certificates are not limited to being stored in storage 550, and may be stored in ROM 120, RAM 130, or management server 200.

<Blockchain Data>

Figure 18:
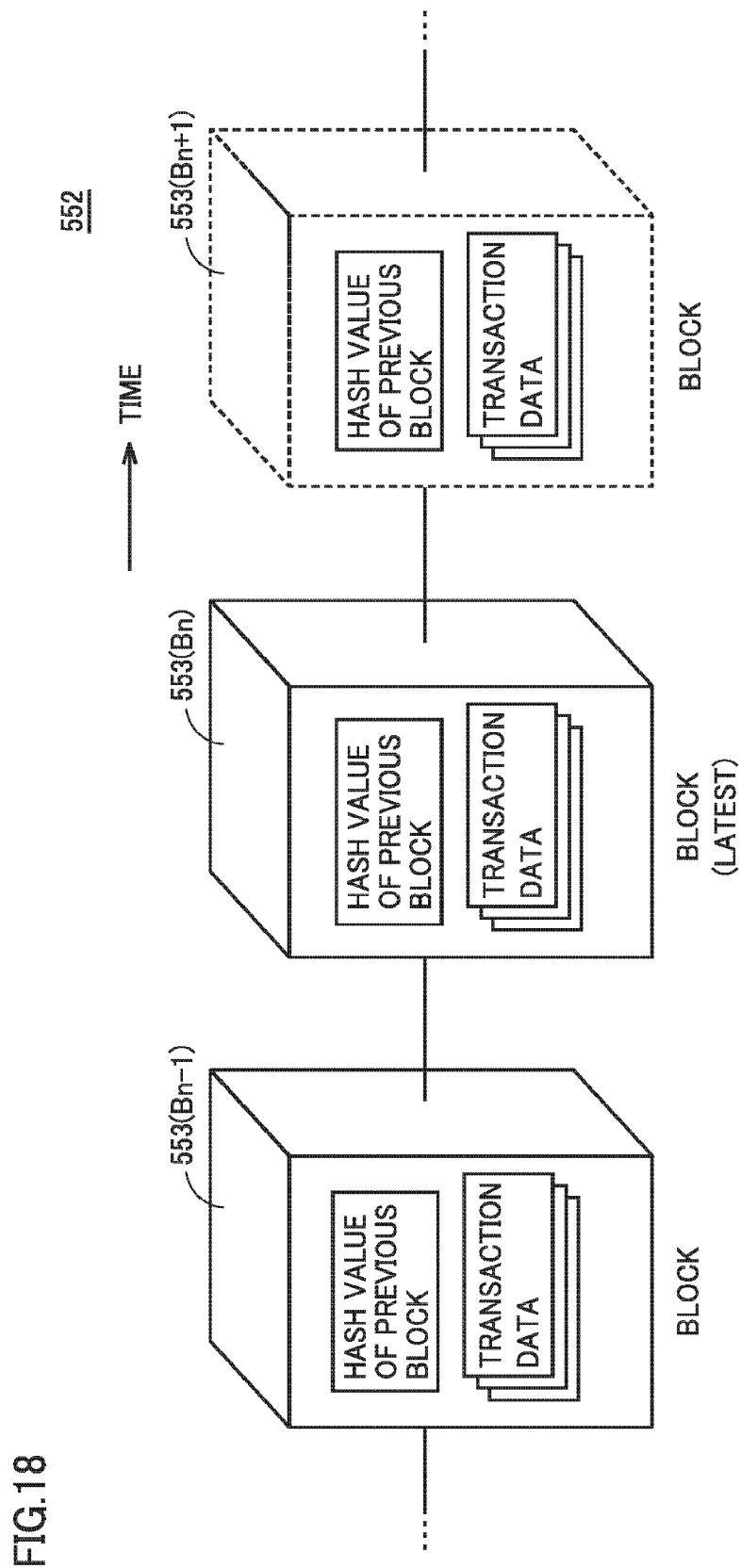
FIG. 18 is a diagram for illustrating blockchain data.

FIG. 18 is a diagram for illustrating blockchain data 552. As shown in FIG. 18, blockchain data 552 is constituted of a series of a plurality of blocks 553. Each of blocks 553 includes various types of information such as intellectual-property-related data. Blockchain data 552 stores a history of recording of intellectual-property-related data in data management apparatuses 500, 500A that form network NW, during a period of time from the start of operation of data management system 2 to the present time.

Blockchain data 552 is stored in each of all the data management apparatuses 500, 500A that form network NW. Thus, even if blockchain data 552 is tampered with by a certain user, the tampering is prevented based on blockchain data 552 of each of a plurality of other users as a reference.

Specifically, when registering new intellectual-property-related data, data management apparatus 500 stores, into management server 200, the intellectual-property-related data to be newly registered, and generates data (transaction data) of a transaction indicating this process. Data management apparatus 500 hashes the intellectual-property-related data using a hash function, and generates transaction data including a numerical value (hash value) obtained as a result of the hashing. Data management apparatus 500 transmits the generated transaction data to network NW. The transaction data is collected into a new block 553 (Bn+1). When a certain condition is satisfied, new block 553 (Bn+1) is added to blockchain data 552.

It should be noted that the transaction data is not recognized as being valid only when the transaction data flows to network NW. The transaction data becomes valid only when the transaction data is added to blockchain data 552 held in each of data management apparatuses 500, 500A. Unapproved transaction data is collected into new block 553 (Bn+1), and new block 553 (Bn+1) is added to blockchain data 552 by a mining process called POW (Proof of Work), for example.

The POW is a mechanism for competing addition of new block 553 (Bn+1) among a plurality of nodes (management apparatuses 500, 500A). The nodes participating in the POW are generally called minors. A minor having generated new block 553 (Bn+1) most quickly is given a reward. With a consensus building algorithm using such a mechanism, resistance of blockchain data 552 against tampering is secured.

<Transaction Data>

For example, the transaction data includes: invention ID information; a hash value of target data (intellectual-property-related data such as a document); time information of broadcasting the transaction data to network NW; transmitter information for the transaction data; an electronic signature; and the like. It should be noted that the time information included in the transaction data may be time information indicating a time of occurrence of a process corresponding to the transaction data (for example, a process of recording the target data in management server 200).

The transmitter information for the transaction data is, for example, information indicating company A in the case of the transaction data transmitted to network NW by data management apparatus 500. It should be noted that more specifically, the transmitter information for the transaction data may be information indicating a department (one section of company A) that has performed the operation of transmitting the transaction data to network NW, or may be information indicating an individual (an employee of company A) who has performed the operation of transmitting the transaction data to network NW.

<Application for Proof of Existence (Acquisition of Time Stamp Token)>

Figure 19:
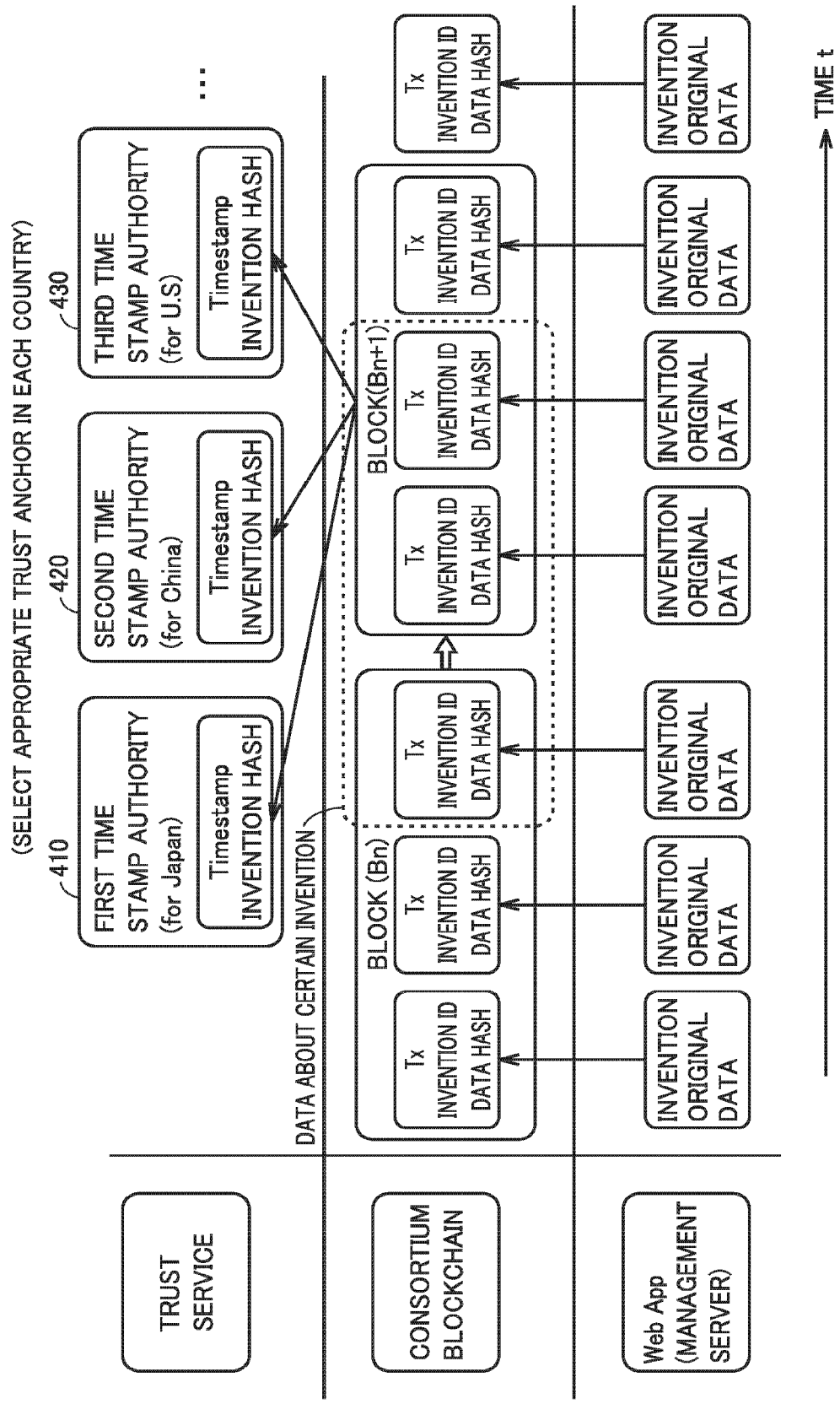
FIG. 19 is a diagram for illustrating an overview of making an application for a proof of existence (acquisition of a time stamp token).

FIG. 19 is a diagram for illustrating an overview of making an application for a proof of existence (acquisition of a time stamp token). Referring to FIG. 19, when storing the intellectual-property-related data (invention original data in FIG. 19) into management server 200, data management apparatus 500 hashes the intellectual-property-related data and transmits transaction data including the hash value to network NW so as to include the data in blockchain data 552. For example, at a certain timing, the user of data management apparatus 500 makes an application for a proof of existence for a certain invention ID. Then, data management apparatus 500 reads out pieces of transaction data associated with the invention ID from the respective blocks and collectively hashes them to generate an invention hash. Then, data management apparatus 500 transmits the invention hash to time stamp authority group 400 (specifically, each of selected time stamp authorit(ies)). Each time stamp authority having received the invention hash generates a time stamp token obtained by combining the invention hash with time information that is based on a time source having traceability in the international standard time. With this time stamp token, it can be proved that the data included in blockchain data 552 has existed at that time.

The verification of proof of existence and the validation of electronic certificate are performed in the same manner as in the first embodiment, and therefore will not be described repeatedly.

As described above, the same effect as that of the first embodiment can be exhibited by applying, to data management system 2, the distributed ledger technology using the blockchain.

The embodiments disclosed herein are illustrative and non-restrictive in any respect. The scope of the present disclosure is defined by the terms of the claims, rather than the description of the embodiments described above, and is intended to include any modifications within the scope and meaning equivalent to the terms of the claims.

REFERENCE SIGNS LIST

1, 2: data management system; 100, 100A: data management apparatus; 110: controller; 120: ROM; 130: RAM; 140: communication apparatus; 150: storage; 152: DAG data; 160: input apparatus; 170: display apparatus; 171: selection region; 172: first display region; 173: second display region; 174: third display region; 175: fourth display region; 176: fifth display region; 177: sixth display region; 179: pop-up screen; 180: bus; 200: management server; 300: certification authority group; 310: first certification authority; 320: second certification authority; 330: third certification authority; 340: fourth certification authority; 400: time stamp authority group; 410: first time stamp authority; 420: second time stamp authority; 430: third time stamp authority; 440: fourth time stamp authority; 500, 500A: data management apparatus; 510: controller; 550: storage; 552: blockchain data; 1101: information acquisition unit; 1103: transaction data generation unit; 1105: electronic signature unit; 1107: transaction data transmission unit; 1111: input acquisition unit; 1113: display control unit; 1115: selection determination unit; 1117: invention hash generation unit; 1119: transmission unit; 1121: reception unit; 1131: input acquisition unit; 1133: invention hash generation unit; 1135: readout unit; 1137: comparison unit; 1139: output unit; 1141: input acquisition unit; 1143: readout unit; 1145: selection unit; 1147: decoding unit; 1149: determination unit; 1151: output unit; NW: network.

The invention claimed is:

1. A data management apparatus that manages data using a distributed ledger technology, the data management apparatus comprising:
 a storage that stores a distributed ledger;
 a controller that registers, in the distributed ledger, transaction data including information of the data; and
 a communication apparatus that is capable of communicating with a plurality of time stamp authorities, wherein
 the plurality of time stamp authorities are time stamp authorities that are based on standards different from each other,
 the controller transmits the transaction data to at least one selected time stamp authority of the plurality of time stamp authorities via the communication apparatus, and acquires a time stamp token of the transaction data from the selected time stamp authority,
 the controller registers the time stamp token in the distributed ledger,
 the communication apparatus is capable of communicating with a plurality of key certification authorities,
 the plurality of key certification authorities are certification authorities that respectively issue, based on standards different from each other, electronic certificates to private keys and public keys, a public key of the public keys being paired with a private key of the private keys,
 the electronic certificates include respective pieces of information of the public keys,
 the storage stores (i) the private keys respectively corresponding to the plurality of key certification authorities and (ii) the electronic certificates respectively issued by the plurality of key certification authorities,
 the controller generates electronic signatures for the plurality of key certification authorities by using the private keys, respectively, and
 the controller includes, in the transaction data, the respective electronic signatures for the plurality of key certification authorities.

2. A data management apparatus that manages data using a distributed ledger technology, the data management apparatus comprising:
- a storage that stores a distributed ledger;
- a controller that registers, in the distributed ledger, transaction data including information of the data; and
- a communication apparatus that is capable of communicating with a plurality of time stamp authorities, wherein
- the plurality of time stamp authorities are time stamp authorities that are based on standards different from each other,
- the controller transmits the transaction data to at least one selected time stamp authority of the plurality of time stamp authorities via the communication apparatus, and acquires a time stamp token of the transaction data from the selected time stamp authority,
- the controller registers the time stamp token in the distributed ledger,
- the communication apparatus is capable of communicating with a plurality of key certification authorities,
- the plurality of key certification authorities are certification authorities that respectively issue, based on standards different from each other, electronic certificates to private keys and public keys, a public key of the public keys being paired with a private key of the private keys,
- the electronic certificates include respective pieces of information of the public keys,
- the storage stores (i) the private keys respectively corresponding to the plurality of key certification authorities and (ii) the electronic certificates respectively issued by the plurality of key certification authorities,
- the controller generates electronic signatures for the plurality of key certification authorities by using the private keys, respectively,
- for one process, the controller registers, in the distributed ledger, a plurality of pieces of transaction data corresponding to the plurality of key certification authorities, and
- each of the plurality of pieces of transaction data includes an electronic signature of a corresponding key certification authority.

3. The data management apparatus according to claim 1, wherein
- the controller decodes each of the electronic signatures for the plurality of key certification authorities by using a corresponding public key included in each of the electronic certificates for the plurality of key certification authorities, and
- the controller verifies, based on a result of the decoding, a validity of each of the electronic signatures for the plurality of key certification authorities.

4. A data management method for a data management apparatus that manages data using a distributed ledger technology, wherein
the data management apparatus include
- a storage that stores a distributed ledger,
- a controller that registers, in the distributed ledger, transaction data including information of the data, and
- a communication apparatus that is capable of communicating with a plurality of time stamp authorities, and
the plurality of time stamp authorities are time stamp authorities that are based on standards different from each other,
the data management method comprising:
transmitting the transaction data to at least one selected time stamp authority of the plurality of time stamp authorities;
acquiring a time stamp token of the transaction data from the selected time stamp authority; and
registering the time stamp token in the distributed ledger, wherein
the communication apparatus is capable of communicating with a plurality of key certification authorities,
the plurality of key certification authorities are certification authorities that respectively issue, based on standards different from each other, electronic certificates to private keys and public keys, a public key of the public keys being paired with a private key of the private keys,
the electronic certificates include respective pieces of information of the public keys,
the storage stores (i) the private keys respectively corresponding to the plurality of key certification authorities and (ii) the electronic certificates respectively issued by the plurality of key certification authorities,
the controller generates electronic signatures for the plurality of key certification authorities by using the private keys, respectively, and
the controller includes, in the transaction data, the respective electronic signatures for the plurality of key certification authorities.

5. The data management method according to claim 4, wherein
- the controller decodes each of the electronic signatures for the plurality of key certification authorities by using a corresponding public key included in each of the electronic certificates for the plurality of key certification authorities, and
- the controller verifies, based on a result of the decoding, a validity of each of the electronic signatures for the plurality of key certification authorities.

* * * * *